US012156167B2

(12) United States Patent
Wu et al.

(10) Patent No.: US 12,156,167 B2
(45) Date of Patent: Nov. 26, 2024

(54) COMPLEMENTARY TIMING INFORMATION FOR POSITIONING REFERENCE SIGNALS FOR NON-TERRESTRIAL NETWORKS

(71) Applicant: QUALCOMM Incorporated, San Diego, CA (US)

(72) Inventors: Qiang Wu, San Diego, CA (US); Xiao Feng Wang, San Diego, CA (US); Huilin Xu, Temecula, CA (US); Iyab Issam Sakhnini, San Diego, CA (US); Dan Zhang, San Diego, CA (US); Yiqing Cao, Beijing (CN); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/759,073

(22) PCT Filed: Feb. 7, 2020

(86) PCT No.: PCT/CN2020/074517
§ 371 (c)(1),
(2) Date: Jul. 19, 2022

(87) PCT Pub. No.: WO2021/155582
PCT Pub. Date: Aug. 12, 2021

(65) Prior Publication Data
US 2023/0058532 A1   Feb. 23, 2023

(51) Int. Cl.
*H04W 64/00*   (2009.01)
(52) U.S. Cl.
CPC ................................ *H04W 64/00* (2013.01)

(58) Field of Classification Search
CPC ..................................................... H04W 64/00
See application file for complete search history.

(56) References Cited

U.S. PATENT DOCUMENTS

2009/0149202 A1*   6/2009   Hill ..................... G01S 5/0289
                                                      342/357.22
2010/0331013 A1*   12/2010  Zhang .................. G01S 5/0249
                                                      455/456.2
(Continued)

FOREIGN PATENT DOCUMENTS

CN   102461292 A   5/2012
CN   110547004 A   12/2019
(Continued)

OTHER PUBLICATIONS

Fischer S., "Observed Time Difference of Arrival (OTDOA) Positioning in 3GPP LTE", Jun. 6, 2014, XP055549372, pp. 1-62, section 7, figures 6-4, pp. 32-33, points 1-5, chapters 6 and 7.
(Continued)

*Primary Examiner* — Adam D Houston
(74) *Attorney, Agent, or Firm* — Thien T. Nguyen

(57) ABSTRACT

Disclosed are techniques for positioning. A receiver receives complementary timing information associated with the positioning reference signals (PRS) of a repetition of a PRS sequence. The complementary timing information distinguishes a repetition of a PRS sequence from remaining repetitions of the PRS sequence. Based on the complementary timing information associated with different PRS from different non-terrestrial vehicles indicating that the PRS were transmitted during the same radio frame, the receiver can determine an observed time difference of arrival (OTDOA) between the PRS received from the respective non-terrestrial vehicles.

68 Claims, 14 Drawing Sheets

(56) References Cited

U.S. PATENT DOCUMENTS

| | | | |
|---|---|---|---|
| 2015/0188678 A1* | 7/2015 | Wu | G01S 1/14 |
| | | | 455/456.6 |
| 2016/0134402 A1* | 5/2016 | Park | H04L 27/2663 |
| | | | 370/329 |
| 2017/0102447 A1* | 4/2017 | Choi | H04W 56/001 |
| 2018/0048444 A1 | 2/2018 | Park et al. | |
| 2018/0049151 A1 | 2/2018 | Yoon et al. | |
| 2018/0217228 A1 | 8/2018 | Edge et al. | |
| 2019/0245663 A1 | 8/2019 | Kim et al. | |
| 2023/0179295 A1* | 6/2023 | Duan | G01S 19/00 |
| | | | 455/427 |
| 2024/0069143 A1* | 2/2024 | Hirzallah | G01S 5/0246 |
| 2024/0089893 A1* | 3/2024 | Masal | H04W 64/00 |
| 2024/0195489 A1* | 6/2024 | Charbit | H04B 7/18519 |
| 2024/0210515 A1* | 6/2024 | Li | G01S 5/011 |
| 2024/0251374 A1* | 7/2024 | Wei | G01S 5/10 |

FOREIGN PATENT DOCUMENTS

| | | | | |
|---|---|---|---|---|
| WO | WO-2007056738 A2 * | 5/2007 | | G01S 19/14 |
| WO | 2018144146 A1 | 8/2018 | | |

OTHER PUBLICATIONS

Supplementary European Search Report—EP20917741—Search Authority—Munich—Sep. 26, 2023.
International Search Report and Written Opinion—PCT/CN2020/074517—ISA/EPO—Nov. 2, 2020.
Nokia.,et al., "Positioning in NTN", 3GPP TSG RAN WG1 Meeting #98bis, R1-1911223, Chongqing, China, Oct. 14-20, 2019, Oct. 20, 2019 (Oct. 20, 2019), the Whole Document, pp. 1-7.

* cited by examiner

900

```
┌──────────┐
│ Receiver │
└──────────┘
```

Measure a ToA of at least one PRS transmission of a repetition of a first PRS sequence of a plurality of repetitions of the first PRS sequence transmitted by a first non-terrestrial vehicle — 910

Receive first complementary timing information associated with the repetition of the first PRS sequence, wherein the first complementary timing information distinguishes the repetition of the first PRS sequence from remaining repetitions of the plurality of repetitions of the first PRS sequence — 920

Measure a ToA of at least one PRS transmission of a repetition of a second PRS sequence of a plurality of repetitions of the second PRS sequence transmitted by a second non-terrestrial vehicle — 930

Receive second complementary timing information associated with the repetition of the second PRS sequence, wherein the second complementary timing information distinguishes the repetition of the second PRS sequence from remaining repetitions of the plurality of repetitions of the second PRS sequence — 940

Determine, based on the first complementary timing information and the second complementary timing information, an OTDOA between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence. — 950

```
   Non-
Terrestrial
  Vehicle
```

Transmit at least one PRS transmission of a repetition of a PRS sequence of a plurality of repetitions of the PRS sequence — 1010

Transmit complementary timing information associated with the repetition of the PRS sequence, wherein the complementary timing information distinguishes the repetition of the PRS sequence from remaining repetitions of the plurality of repetitions of the PRS sequence. — 1020

FIG. 10

COMPLEMENTARY TIMING INFORMATION FOR POSITIONING REFERENCE SIGNALS FOR NON-TERRESTRIAL NETWORKS

CROSS-REFERENCE TO RELATED APPLICATIONS

The present application claims priority to International Application No. PCT/CN2020/074517, filed Feb. 7, 2020, which is herein incorporated by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a receiver device includes measuring a time of arrival (ToA) of at least one positioning reference signal (PRS) transmission of a repetition of a first PRS sequence of a plurality of repetitions of the first PRS sequence transmitted by a first non-terrestrial vehicle, receiving first complementary timing information associated with the repetition of the first PRS sequence, wherein the first complementary timing information distinguishes the repetition of the first PRS sequence from remaining repetitions of the plurality of repetitions of the first PRS sequence, measuring a ToA of at least one PRS transmission of a repetition of a second PRS sequence of a plurality of repetitions of the second PRS sequence transmitted by a second non-terrestrial vehicle, receiving second complementary timing information associated with the repetition of the second PRS sequence, wherein the second complementary timing information distinguishes the repetition of the second PRS sequence from remaining repetitions of the plurality of repetitions of the second PRS sequence, and determining, based on the first complementary timing information and the second complementary timing information, an observed time difference of arrival (OTDOA) between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

In an aspect, a method of operating a non-terrestrial vehicle includes transmitting at least one PRS transmission of a repetition of a PRS sequence of a plurality of repetitions of the PRS sequence, and transmitting complementary timing information associated with the repetition of the PRS sequence, wherein the complementary timing information distinguishes the repetition of the PRS sequence from remaining repetitions of the plurality of repetitions of the PRS sequence.

In an aspect, a receiver device includes a memory, at least one transceiver, and at least one processor communicatively coupled to the memory and the at least one transceiver, wherein the at least one processor is configured to: measure a ToA of at least one PRS transmission of a repetition of a first PRS sequence of a plurality of repetitions of the first PRS sequence transmitted by a first non-terrestrial vehicle, receive, via the at least one transceiver, first complementary timing information associated with the repetition of the first PRS sequence, wherein the first complementary timing information distinguishes the repetition of the first PRS sequence from remaining repetitions of the plurality of repetitions of the first PRS sequence, measure a ToA of at least one PRS transmission of a repetition of a second PRS sequence of a plurality of repetitions of the second PRS sequence transmitted by a second non-terrestrial vehicle, receive, via the at least one transceiver, second complementary timing information associated with the repetition of the second PRS sequence, wherein the second complementary timing information distinguishes the repetition of the second PRS sequence from remaining repetitions of the plurality of repetitions of the second PRS sequence, and determine, based on the first complementary timing information and the second complementary timing information, an OTDOA between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

In an aspect, a non-terrestrial vehicle includes a memory, at least one transceiver, and at least one processor communicatively coupled to the memory and the at least one transceiver, wherein the at least one processor is configured to: cause the at least one transceiver to transmit at least one PRS transmission of a repetition of a PRS sequence of a plurality of repetitions of the PRS sequence, and cause the at least one transceiver to transmit complementary timing information associated with the repetition of the PRS sequence, wherein the complementary timing information distinguishes the repetition of the PRS sequence from remaining repetitions of the plurality of repetitions of the PRS sequence.

In an aspect, a receiver device includes means for measuring a ToA of at least one PRS transmission of a repetition of a first PRS sequence of a plurality of repetitions of the first PRS sequence transmitted by a first non-terrestrial vehicle, means for receiving first complementary timing information associated with the repetition of the first PRS sequence, wherein the first complementary timing information distinguishes the repetition of the first PRS sequence from remaining repetitions of the plurality of repetitions of the first PRS sequence, means for measuring a ToA of at least one PRS transmission of a repetition of a second PRS sequence of a plurality of repetitions of the second PRS sequence transmitted by a second non-terrestrial vehicle, means for receiving second complementary timing information associated with the repetition of the second PRS sequence, wherein the second complementary timing information distinguishes the repetition of the second PRS sequence from remaining repetitions of the plurality of repetitions of the second PRS sequence, and means for determining, based on the first complementary timing information and the second complementary timing information, an OTDOA between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

In an aspect, a non-terrestrial vehicle includes means for transmitting at least one PRS transmission of a repetition of a PRS sequence of a plurality of repetitions of the PRS sequence, and means for transmitting complementary timing information associated with the repetition of the PRS sequence, wherein the complementary timing information distinguishes the repetition of the PRS sequence from remaining repetitions of the plurality of repetitions of the PRS sequence.

In an aspect, a non-transitory computer-readable medium storing computer-executable instructions for a receiver device includes computer-executable instructions comprising at least one instruction instructing the receiver device to measure a ToA of at least one PRS transmission of a repetition of a first PRS sequence of a plurality of repetitions of the first PRS sequence transmitted by a first non-terrestrial vehicle, at least one instruction instructing the receiver device to receive first complementary timing information associated with the repetition of the first PRS sequence, wherein the first complementary timing information distinguishes the repetition of the first PRS sequence from remaining repetitions of the plurality of repetitions of the first PRS sequence, at least one instruction instructing the receiver device to measure a ToA of at least one PRS transmission of a repetition of a second PRS sequence of a plurality of repetitions of the second PRS sequence transmitted by a second non-terrestrial vehicle, at least one instruction instructing the receiver device to receive second complementary timing information associated with the repetition of the second PRS sequence, wherein the second complementary timing information distinguishes the repetition of the second PRS sequence from remaining repetitions of the plurality of repetitions of the second PRS sequence, and at least one instruction instructing the receiver device to determine, based on the first complementary timing information and the second complementary timing information, an OTDOA between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

In an aspect, a non-transitory computer-readable medium storing computer-executable instructions for a non-terrestrial vehicle includes computer-executable instructions comprising at least one instruction instructing the non-terrestrial vehicle to transmit at least one PRS transmission of a repetition of a PRS sequence of a plurality of repetitions of the PRS sequence, and at least one instruction instructing the non-terrestrial vehicle to transmit complementary timing information associated with the repetition of the PRS sequence, wherein the complementary timing information distinguishes the repetition of the PRS sequence from remaining repetitions of the plurality of repetitions of the PRS sequence.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 9 and 10 illustrate various exemplary methods, according to aspects of the disclosure.

DETAILED DESCRIPTION

Figure 1:
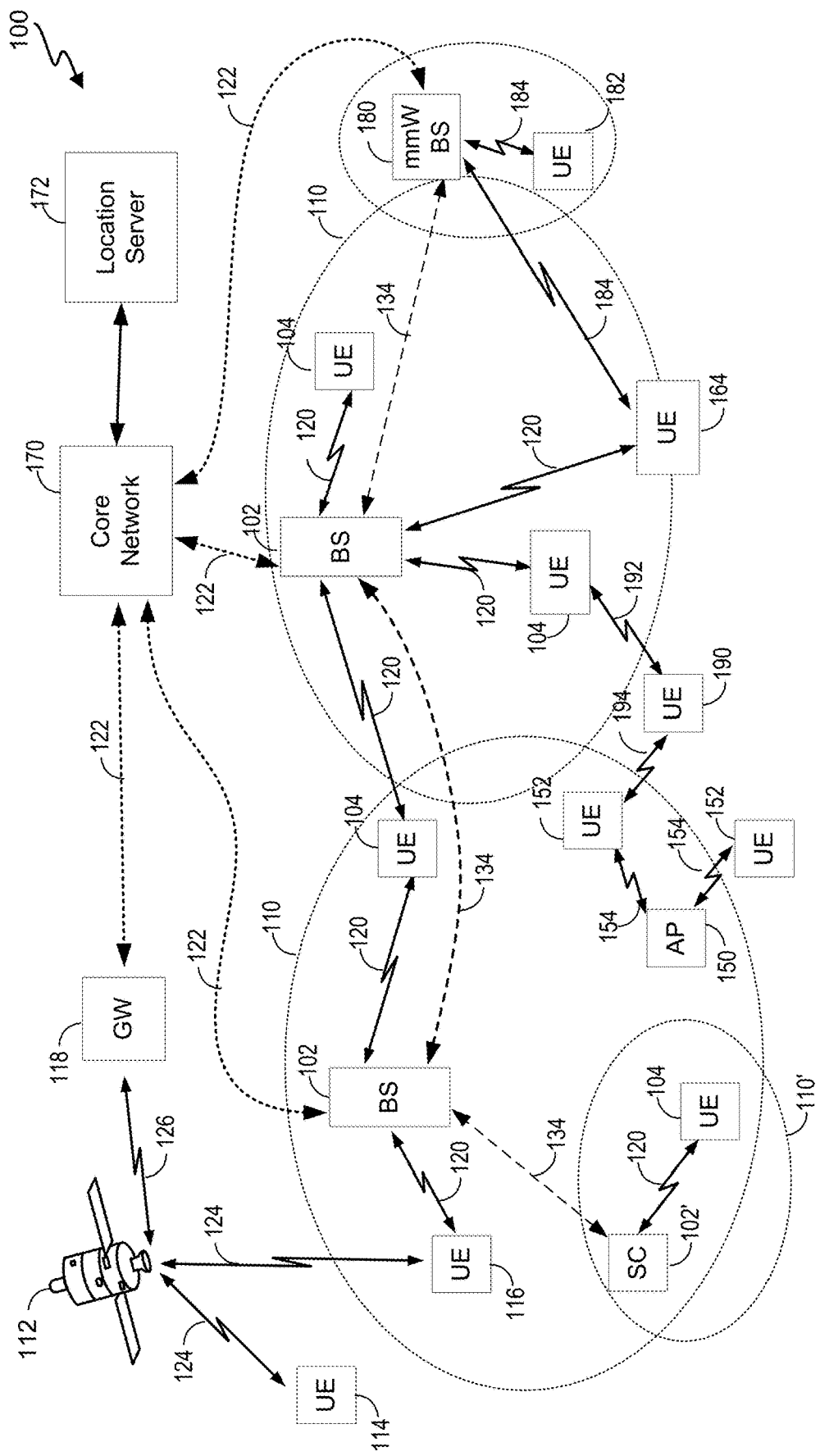
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequy ges, FR1 (from 450 to 6 Hz), FR2 (from 24250 to 52 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

The wireless communications system 100 may further include one or more satellites 112 of a non-terrestrial network (NTN). Due to the wide service coverage capabilities and reduced vulnerability of space/airborne vehicles (e.g., satellite(s) 112) to physical attacks and natural disasters, NTNs may be used to provide 5G NR service in un-served areas that cannot be covered by terrestrial 5G networks (e.g., isolated/remote areas, on board aircrafts or vessels, etc.), and in under-served areas (e.g., suburban/rural areas) to upgrade the performance of limited terrestrial networks in a cost effective manner. With reference to FIG. 1, a satellite 112 is in communication with a UE 114 outside the coverage area of a base station 102 (representing a UE in an area that is not served by a terrestrial 5G network) and with a UE 116 inside the coverage area of a base station 102 (representing a UE that is under-served by the terrestrial 5G network). Thus, satellite 112 may act as a serving base station to UE 114 and as a primary cell or a secondary cell to UE 116, depending on the service provided to UE 116 by base station 102.

NTNs may also be used to reinforce 5G service reliability by providing service continuity for machine-to-machine (M2M) and/or IoT devices, or for passengers on board moving platforms (e.g., passenger vehicles such as aircraft, ships, high speed trains, buses, etc.), or ensuring service availability anywhere, especially for critical communications. NTNs can also enable 5G network scalability by providing efficient multicast/broadcast resources for data delivery towards the network edges or even the UE.

An NTN includes one or more gateways (illustrated as gateway 118) between the space/airborne platforms (e.g., satellite(s) 112) and the core network (e.g., core network 170). The radio link between a UE (e.g., UE 114, 116) and a space/airborne platform (e.g., a satellite 112) is referred to as a "service link" (e.g., service links 124). In addition, a UE may also support a radio link with a terrestrial based RAN, as illustrated by communication link 120 between base station 102 and UE 116. A radio link between a gateway (e.g., gateway 118) and a space/airborne platform (e.g., a satellite 112) is referred to as a "feeder link" (e.g., feeder link 126).

Note that although FIG. 1 illustrates a satellite 112 as the exemplary space/airborne platform, as will be appreciated, the satellite 112 may be any type of manned or unmanned non-terrestrial (i.e., airborne or space) vehicle capable of providing 5G service to UEs in its coverage area. Also, although FIG. 1 only illustrates a single satellite 112 and a single gateway 118, as will be appreciated, this is merely exemplary, and there may be any number of satellites 112 connected to any number of gateways 118. Further details regarding NTNs can be found in the Third Generation Partnership Project (3GPP) Technical Specification (TS) 38.811, which is publicly available and incorporated by reference herein in its entirety.

Figure 2A:
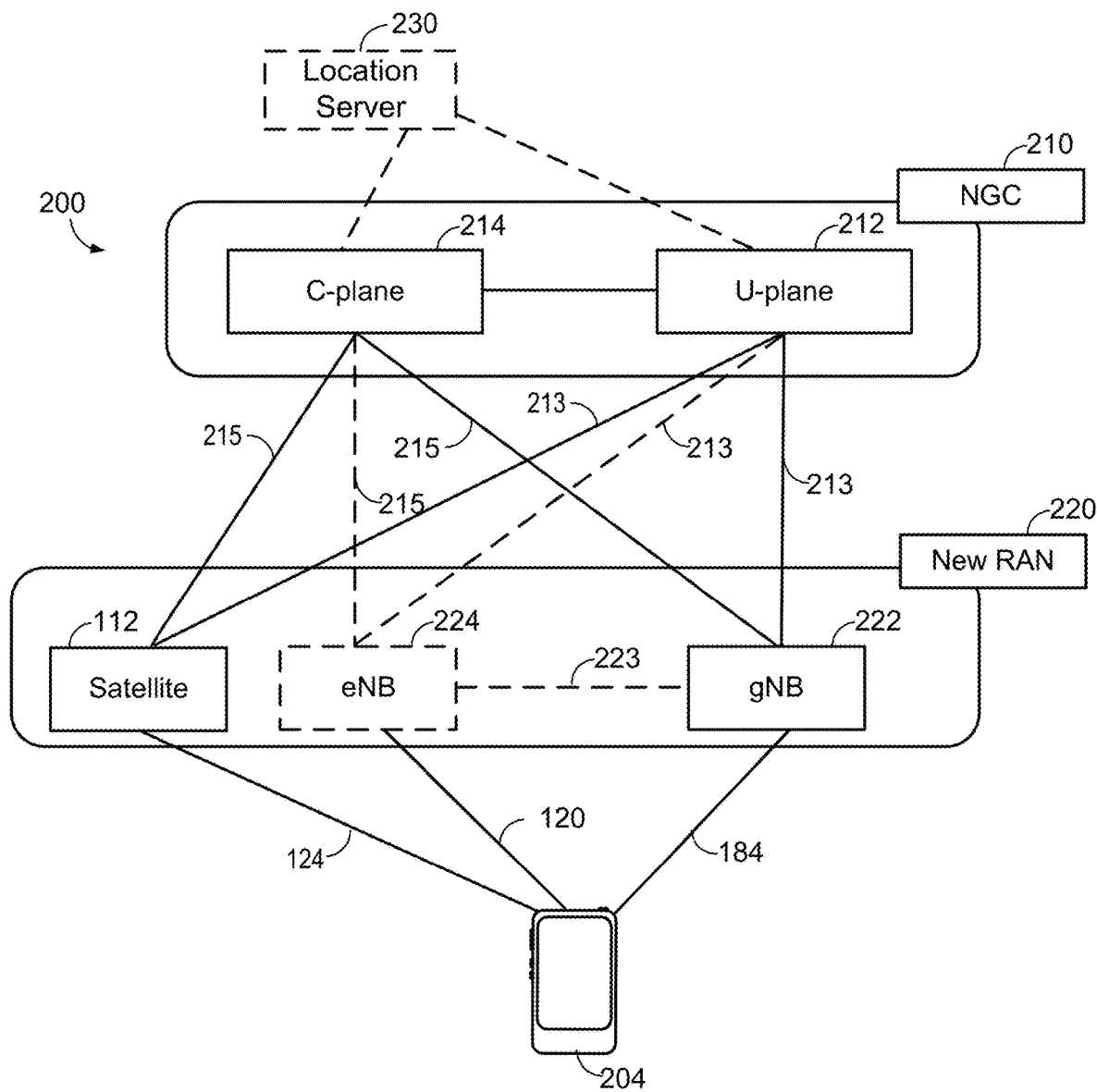
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

FIG. 2A also illustrates a satellite 112 as part of the example wireless network structure 200. The satellite 112 may be the same as illustrated and described with reference to FIG. 1. The UE 204 may communicate with the satellite 112 over a service link 124, as described above with reference to FIG. 1. Like the eNB 224 and the gNB 222, the satellite 112 may communicate with the control plane functions 214 and the user plane functions 212 over the control plane interface (NG-C) 215 and the user plane interface (NG-U) 213, respectively. However, the satellite 112 communicates with the control plane functions 214 and the user plane functions 212 via a gateway (e.g., gateway 118, not shown) between the satellite 112 and the NGC 210. In some cases, the satellite 112 may also communicate with the eNB 224 and the gNB 222 via a wireless backhaul link (not shown), similar to the communication between the eNB 224 and the gNB 222 over backhaul link 223.

Figure 2B:
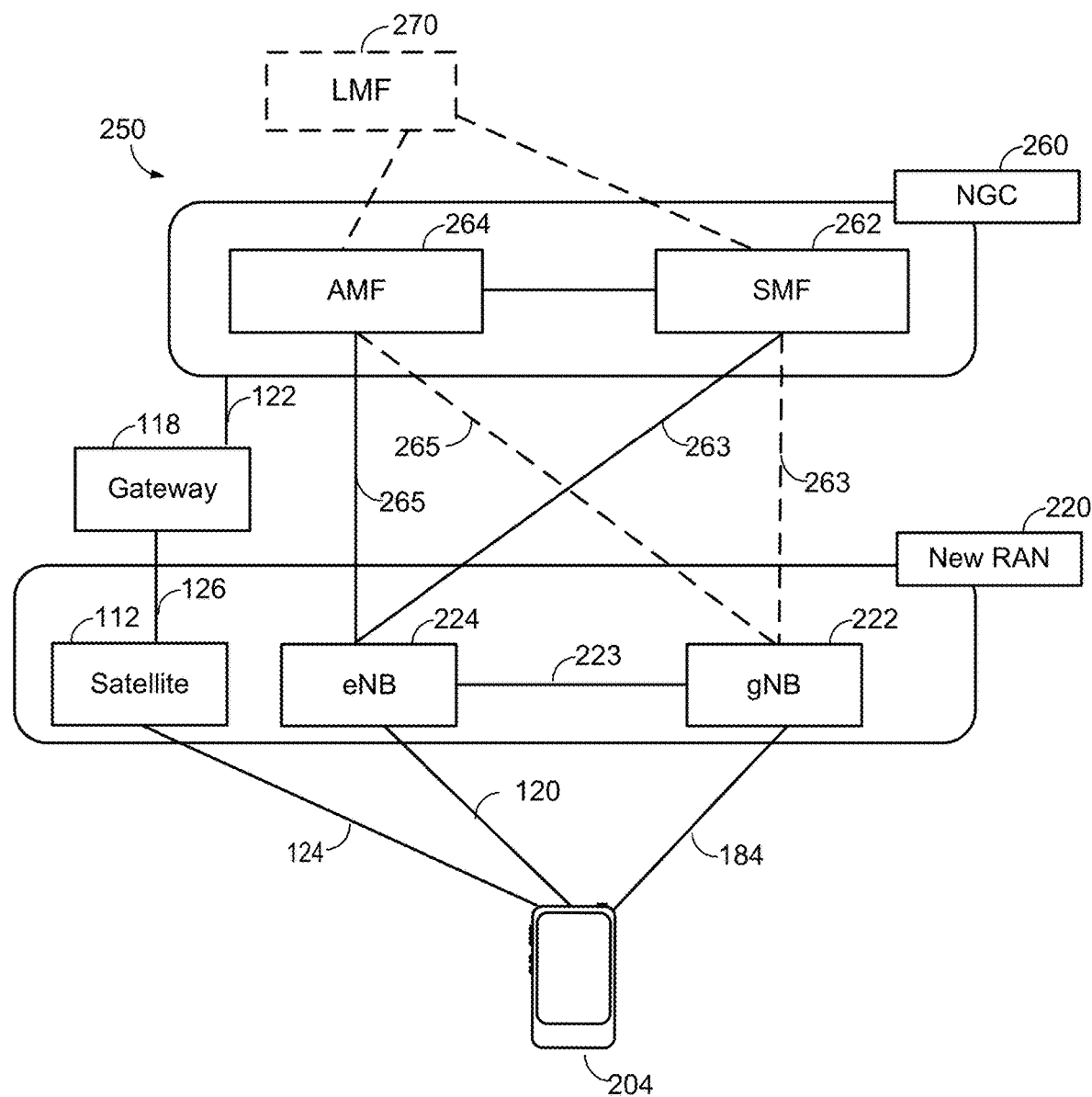

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

Like FIG. 2A, FIG. 2B also illustrates a satellite 112 as part of the example wireless network structure 250. The satellite 112 may be the same as illustrated and described with reference to FIGS. 1 and 2A. The UE 204 may communicate with the satellite 112 over a service link 124, as described above with reference to FIG. 1. The satellite 112 may communicate with a gateway 118 over a feeder link 126, and the gateway 118 may communicate with the NGC 260 over a backhaul link 122. Like the eNB 224 and the gNB 222, the satellite 112 may communicate with the AMF/UPF 264 and the SMF 262 over a control plane interface and a user plane interface, respectively (not shown). However, unlike the eNB 224 and the gNB 222, the satellite 112 communicates with the AMF/UPF 264 and the SMF 262 via the gateway 118.

There are different types of satellite communication architectures, two of which are the "processing payload" and "bentpipe" types. In the case of the processing payload type, the entirety, or at least part of, the eNB/gNB functionality is carried out at the satellite 112. This case is illustrated in FIGS. 2A and 2B by the satellite 112 being included in the New RAN 220. In the case of the bentpipe type, the satellite 112 acts as a relay, and the entirety of the eNB/gNB functionality is performed at the gateway 118. In this case, the gateway 118 may be included in the New RAN 220. The present disclosure is not limited to either type of satellite communication architecture.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
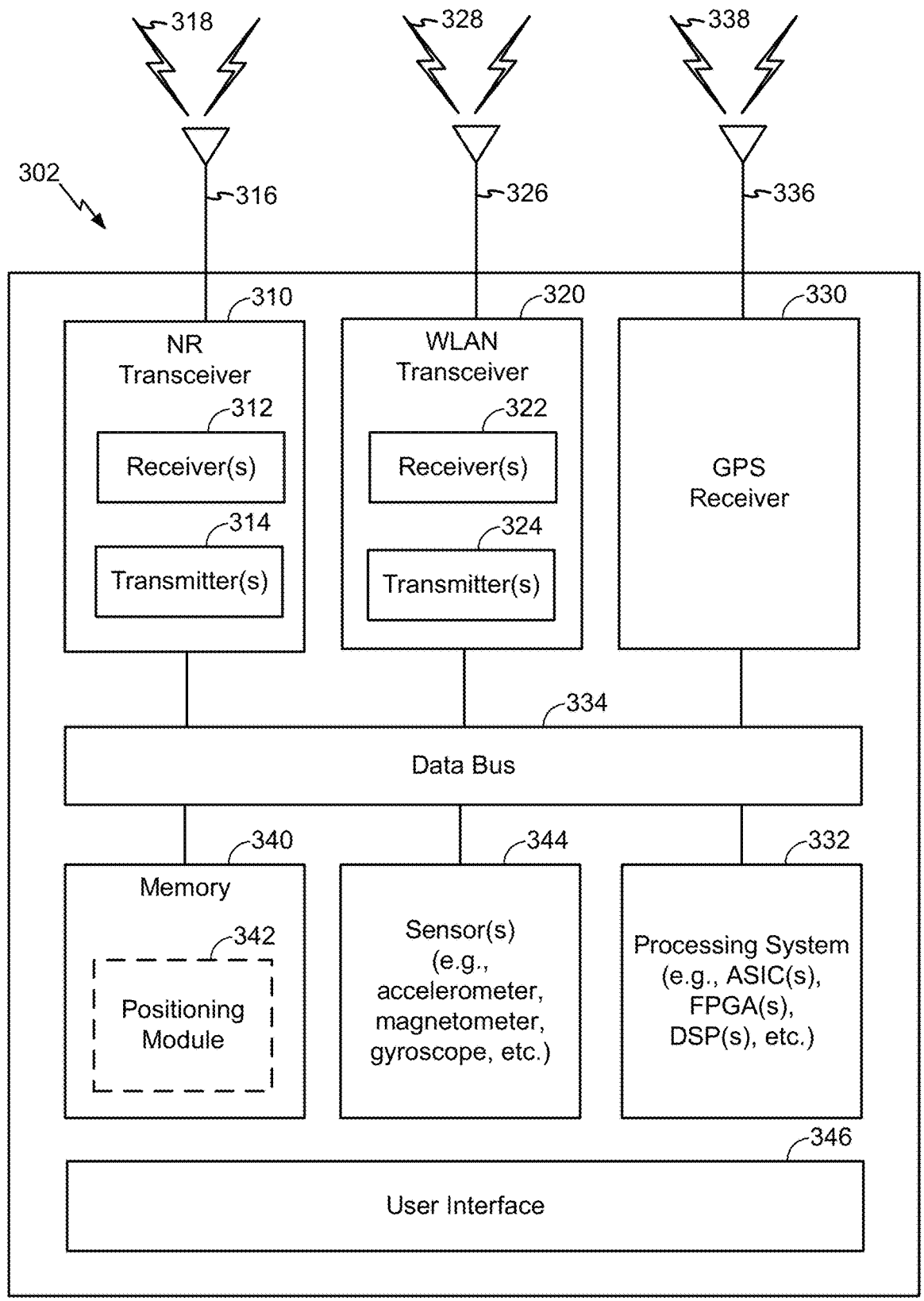
FIGS. 3A to 3C are simplified block diagrams of several sample aspects of components that may be employed in a UE, a space/airborne vehicle, and a network entity, respectively, and configured to support communication in accordance with one or more aspects of the disclosure.
Figure 3B:
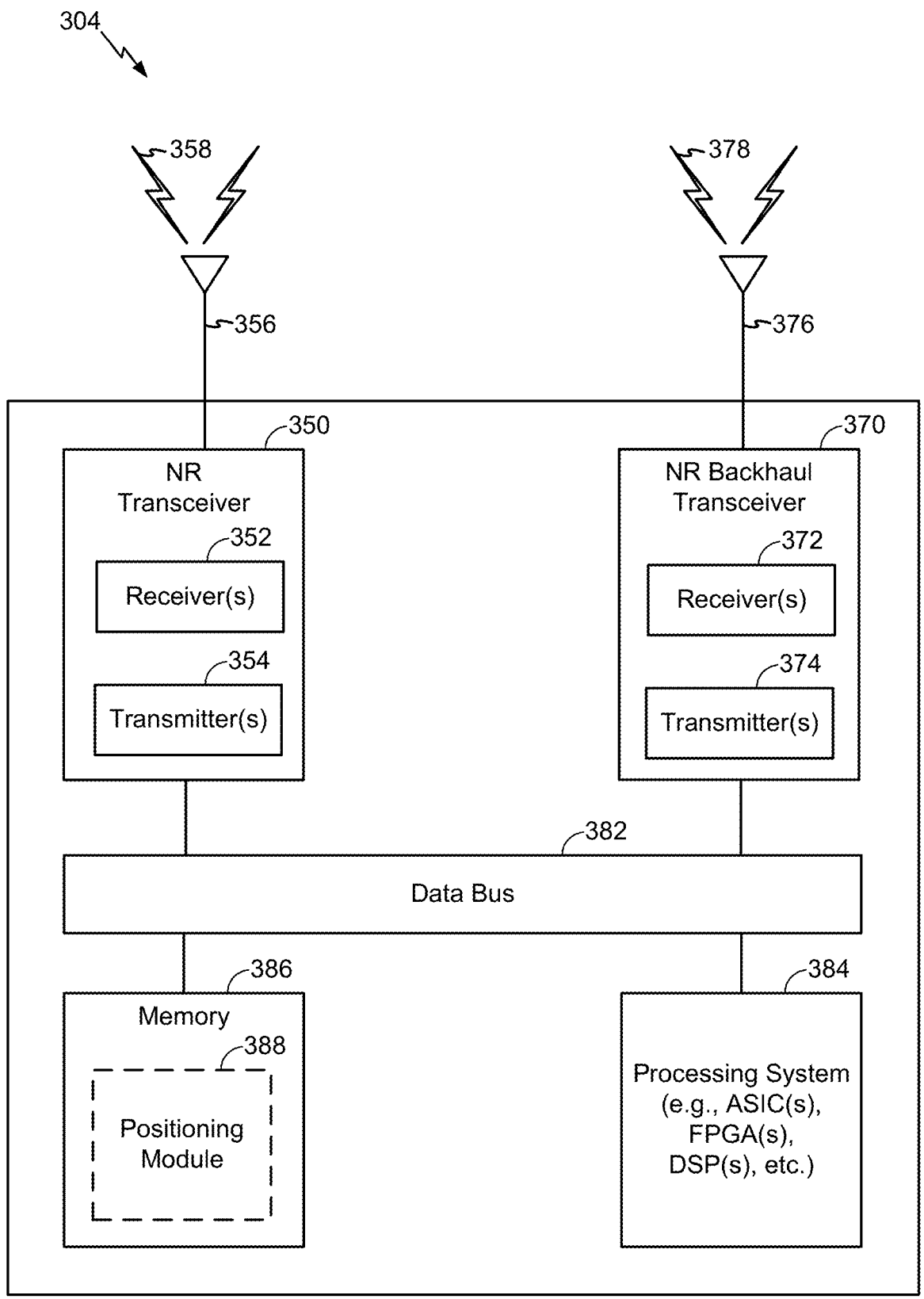
Figure 3C:
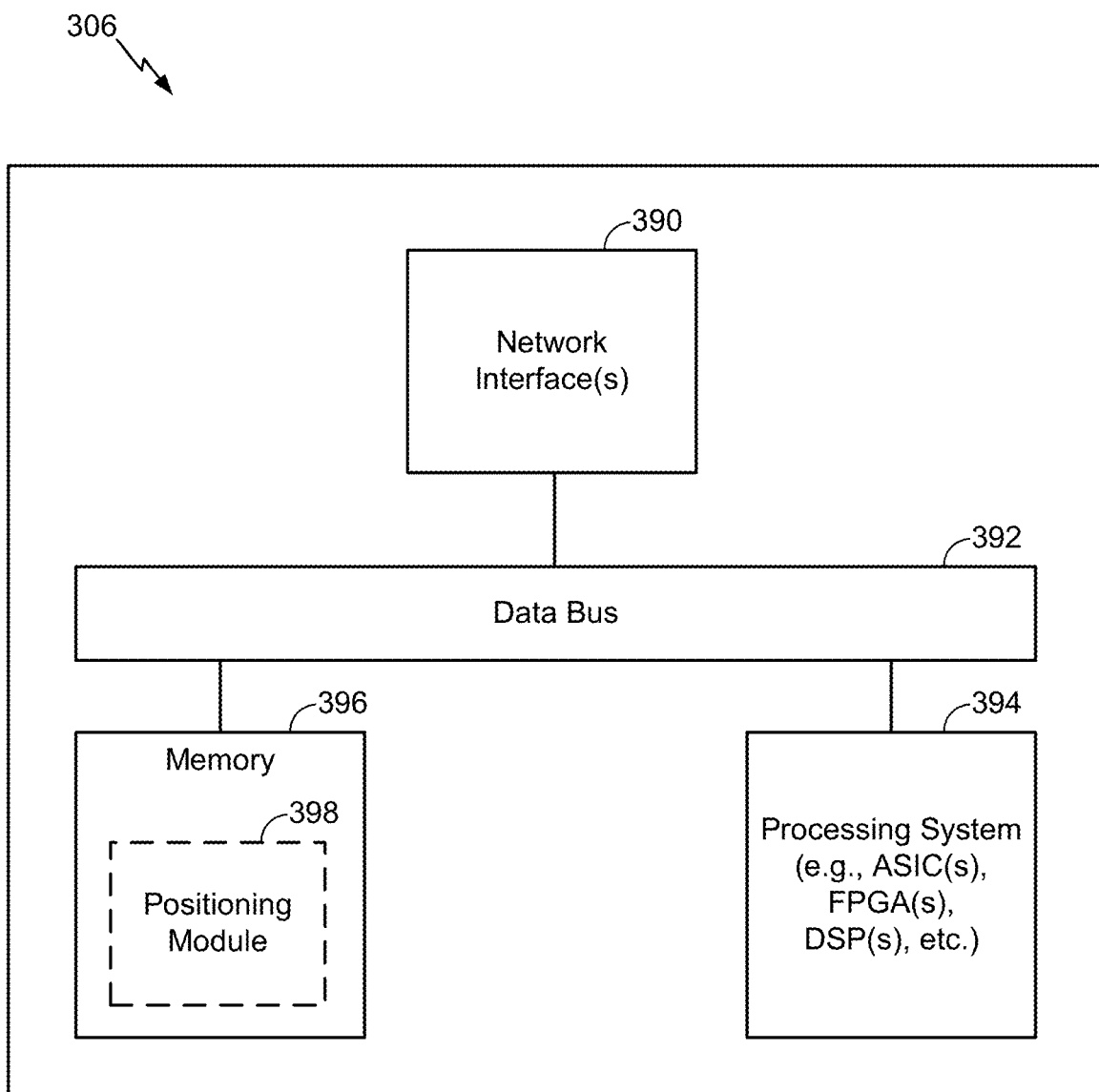

FIGS. 3A, 3B, and 3C illustrate several sample components (represented by corresponding blocks) that may be incorporated into a UE 302 (which may correspond to any of the UEs described herein), a non-terrestrial vehicle 304 (which may correspond to any of the non-terrestrial vehicles described herein, such as satellite 112), and a network entity 306 (which may correspond to or embody any of the network functions described herein, including the location server 230, the LMF 270, the gateway 112, etc.) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 includes at least one NR transceiver 310 configured to communicate via a 5G NR network. Similarly, the non-terrestrial vehicle 304 includes at least one NR transceiver 350 configured to communicate via a 5G NR network. The NR transceivers 310 and 350 may be connected to one or more antennas 316 and 356, respectively, for communicating with other network nodes, such as other UEs, access points, base stations (e.g., eNBs, gNBs), non-terrestrial vehicles, etc., via at least one designated RAT (e.g., NR, LTE, GSM, etc.) over a wireless communication medium of interest (e.g., some set of time/frequency resources in a particular frequency spectrum). The NR transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the NR transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 also includes, at least in some cases, a wireless local area network (WLAN) transceiver 320. The WLAN transceiver 320 may be connected to one or more antennas 326 for communicating with other network nodes, such as other UEs, access points, base stations, etc., via at least one designated RAT (e.g., WiFi, LTE-D, Bluetooth®, etc.) over a wireless communication medium of interest. The WLAN transceiver 320 may be variously configured for transmitting and encoding signals 328 (e.g., messages, indications, information, and so on), and, conversely, for receiving and decoding signals 328 (e.g., messages, indications, information, pilots, and so on), in accordance with the designated RAT. Specifically, the WLAN transceiver 320 includes one or more transmitters 324 for transmitting and encoding signals 328, and one or more receivers 322 for receiving and decoding signals 328.

The non-terrestrial vehicle 304 includes at least one NR backhaul transceiver 370. The NR backhaul transceiver(s) 370 may be connected to one or more antennas 376 for wirelessly communicating with a gateway (e.g., gateway 118) and/or other non-terrestrial vehicles over a wireless communication medium of interest. The NR backhaul transceiver(s) 370 may be variously configured for transmitting and encoding signals 378 (e.g., messages, indications, information, and so on), and, conversely, for receiving and decoding signals 378 (e.g., messages, indications, information, pilots, and so on), in accordance with the designated RAT (e.g., NR). Specifically, the NR backhaul transceiver(s) 370 includes one or more transmitters 374 for transmitting and encoding signals 378, and one or more receivers 372 for receiving and decoding signals 378. Note that although illustrated as separate components, the NR backhaul transceiver(s) 370 may be the same as or included in the NR transceiver(s) 350.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 376), such as an antenna array, that permits the respective apparatus to perform transmit "beamforming," as described herein. Similarly, a receiver may include or be coupled to a plurality of antennas (e.g., antennas 316, 326, 356, 376), such as an antenna array, that permits the respective apparatus to perform receive beamforming, as described herein. In an aspect, the transmitter and receiver may share the same plurality of antennas (e.g., antennas 316, 326, 356, 376), such that the respective apparatus can only receive or transmit at a given time, not both at the same time. A wireless communication device (e.g., one or both of the transceivers 310 and 320 and/or 350 and 370) of the apparatuses 302 and/or 304 may also comprise a network listen module (NLM) or the like for performing various measurements.

The UE 302 also includes, at least in some cases, a global positioning systems (GPS) receiver 330. The GPS receiver 330 may be connected to one or more antennas 336 for receiving GPS signals 338. The GPS receiver 330 may comprise any suitable hardware and/or software for receiving and processing GPS signals 338. The GPS receiver 330 requests information and operations as appropriate from the other systems, and performs calculations necessary to determine the UE's 302 position using measurements obtained by any suitable GPS algorithm.

The network entity 306 includes at least one network interface 390 for communicating with other network entities. For example, the network interface(s) 390 (e.g., one or more network access ports) may be configured to communicate with one or more network entities via a wire-based or wireless backhaul connection. In some aspects, the network interface(s) 390 may be implemented as one or more transceivers configured to support wire-based and/or wireless signal communication (e.g., where the network entity 306 is a gateway in communication with a non-terrestrial vehicle 304). This communication may involve, for example, sending and receiving messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, positioning measurements of NTN reference signals as disclosed herein and for providing other processing functionality. The non-terrestrial vehicle 304 includes a processing system 384 for providing functionality relating to, for example, transmitting reference signals as disclosed herein and for providing other processing functionality. The network entity 306 includes a processing system 394 for providing functionality relating to, for example, configuring NTN reference signals for positioning measurement as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include positioning modules 342, 388, and 398, respectively. The positioning modules 342, 388, and 398 may be hardware circuits that are part of or coupled to the processing systems 332, 384, and 394, respectively, that, when executed, cause the apparatuses 302, 304, and 306 to perform the functionality described herein. Alternatively, the positioning modules 342, 388, and 398 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the NR transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384 via the NR backhaul transceiver(s) 370. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the non-terrestrial vehicle 304. These soft decisions may be based on channel estimates computed by a channel estimator. The soft decisions are then decoded and de-interleaved to recover the data and control signals that were originally transmitted by the non-terrestrial vehicle 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the non-terrestrial vehicle 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the non-terrestrial vehicle 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the non-terrestrial vehicle 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the non-terrestrial vehicle 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 370, the memory components 340, 386, and 396, the positioning modules 342, 388, and 398, etc.

Figure 4A:
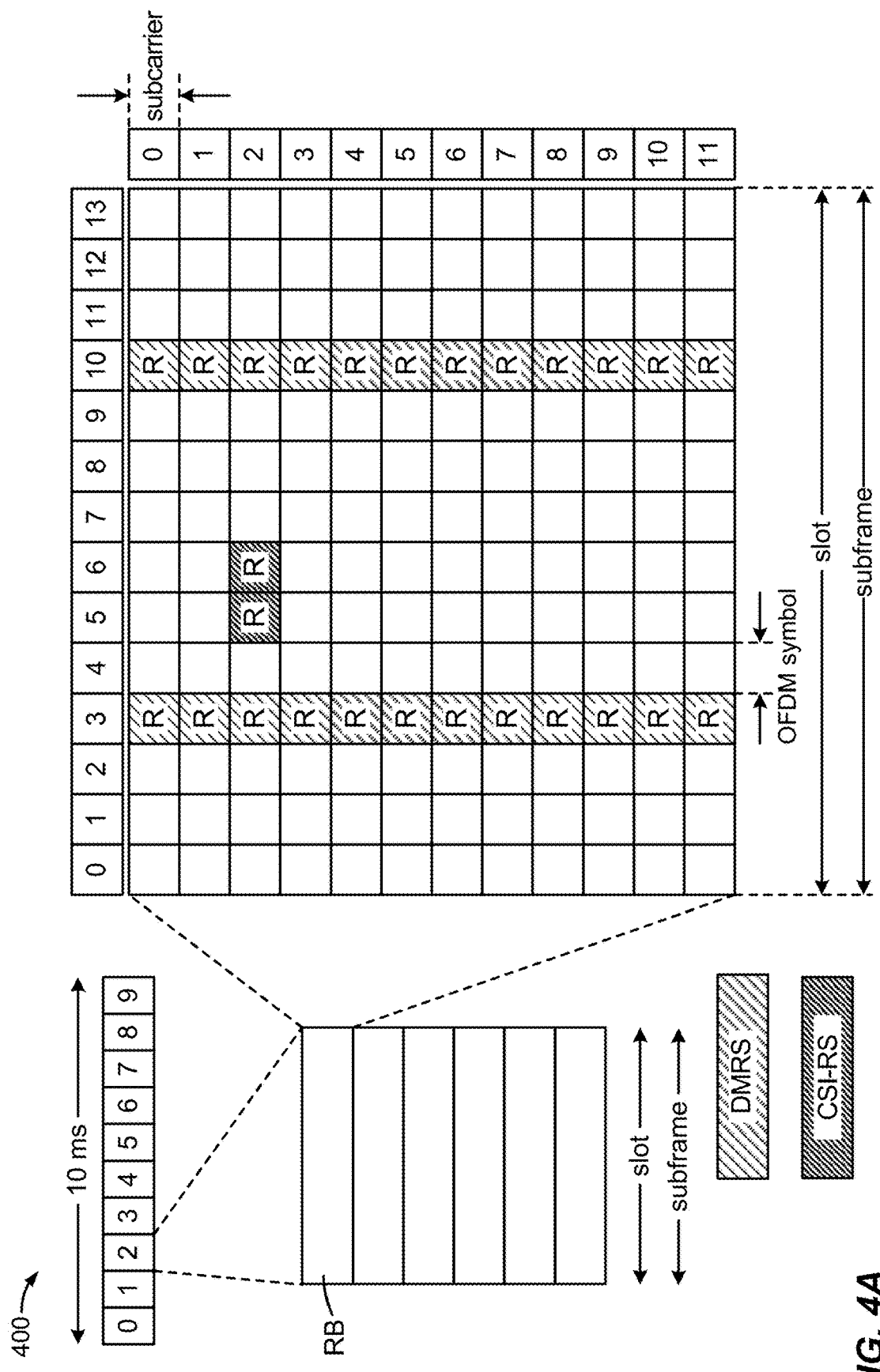
FIGS. 4A and 4B are diagrams illustrating examples of frame structures and channels within the frame structures, according to aspects of the disclosure.
Figure 4B:
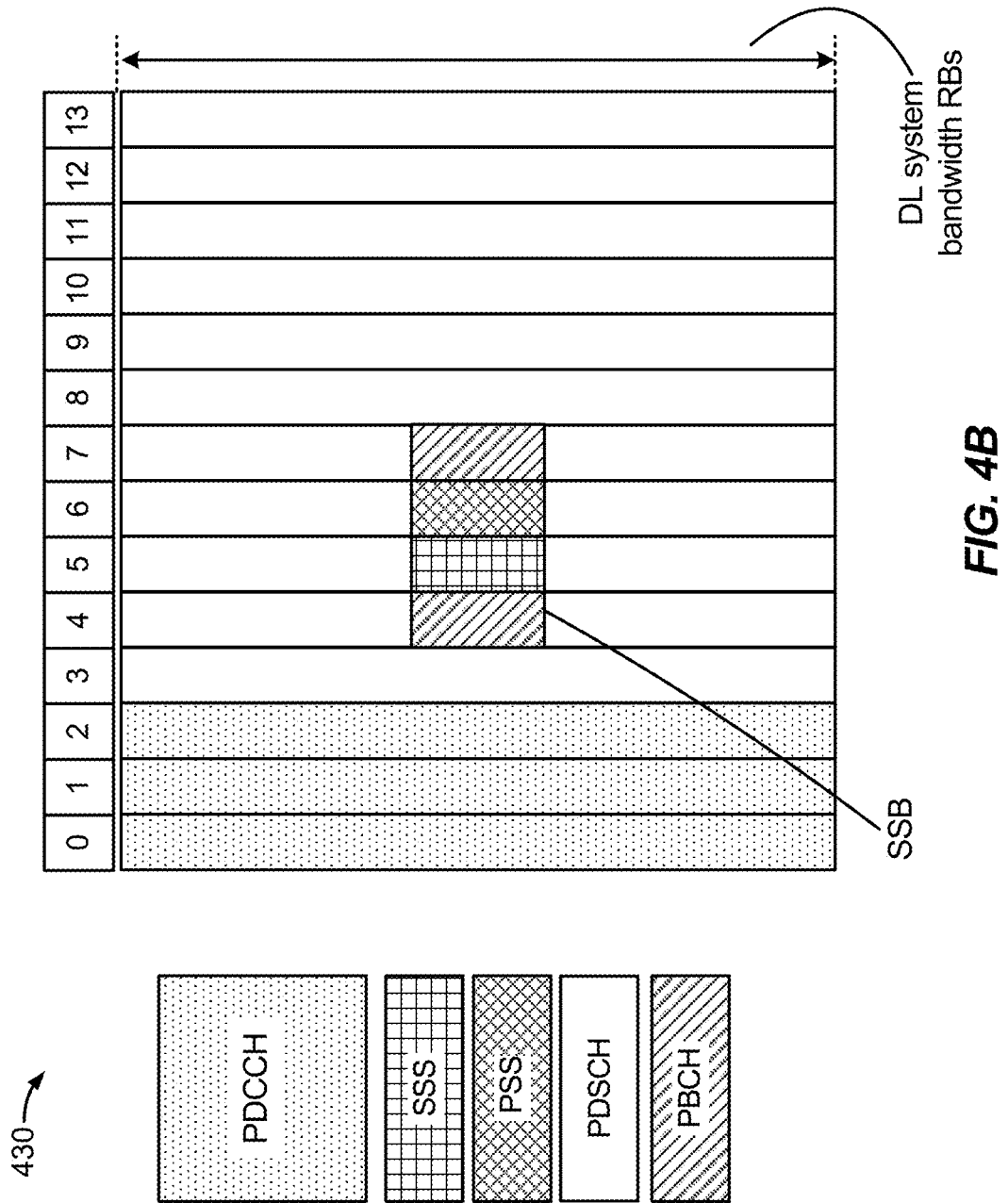

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/slot | slots/subframe | slots/frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB. The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

In some cases, the DL RS illustrated in FIG. 4A may be positioning reference signals (PRS). A collection of resource elements that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance", a "positioning occasion," "a positioning instance," or simply an "occasion" or "instance."

Figure 5:
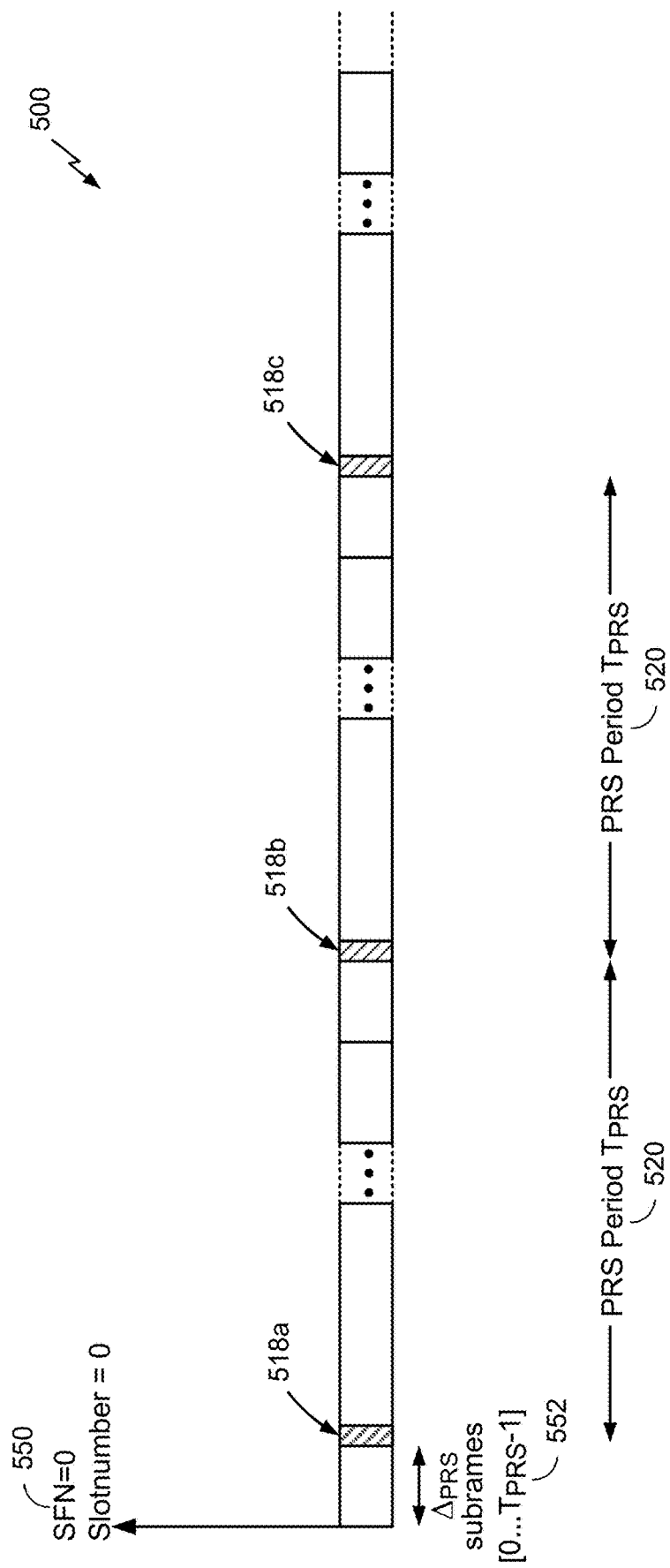
FIG. 5 illustrates an exemplary PRS configuration for a cell supported by a wireless node.

FIG. 5 illustrates an exemplary PRS configuration 500 for a cell supported by a wireless node (such as a base station 102 or a satellite 112). Again, PRS transmission for LTE is assumed in FIG. 5, although the same or similar aspects of PRS transmission to those shown in and described for FIG. 5 may apply to NR and/or other wireless technologies. FIG. 5 shows how PRS positioning occasions are determined by a system frame number (SFN), a cell specific subframe offset ($\Delta_{PRS}$) 552, and the PRS periodicity ($T_{PRS}$) 520. Typically, the cell specific PRS subframe configuration is defined by a "PRS Configuration Index" $I_{PRS}$ included in observed time difference of arrival (OTDOA) assistance data. The PRS periodicity ($T_{PRS}$) 520 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | Reserved | |

A PRS configuration is defined with reference to the system frame number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, is the $T_{PRS}$ periodicity 520, and $\Delta$PRS is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta_{PRS}$ using Table 1. The UE may then determine the radio frame, subframe and slot when a PRS is scheduled in the cell (e.g., using equation (1)). The OTDOA assistance data may be determined by, for example, the location server 170, and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 552) relative to other cells in the network that use a different frequency. In SFN-synchronous networks all wireless nodes (e.g., base stations 102) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE 104 can obtain the cell timing (e.g., SFN) of at least one of the cells, e.g., the reference cell or a serving cell. The timing of the other cells may then be derived by the UE 104 based, for example, on the assumption that PRS occasions from different cells overlap.

For LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described and may, for example, use a low PRS duty cycle (e.g., $N_{PRS}=1$, $T_{PRS}=160$ subframes) or a high duty cycle.

Figure 6:
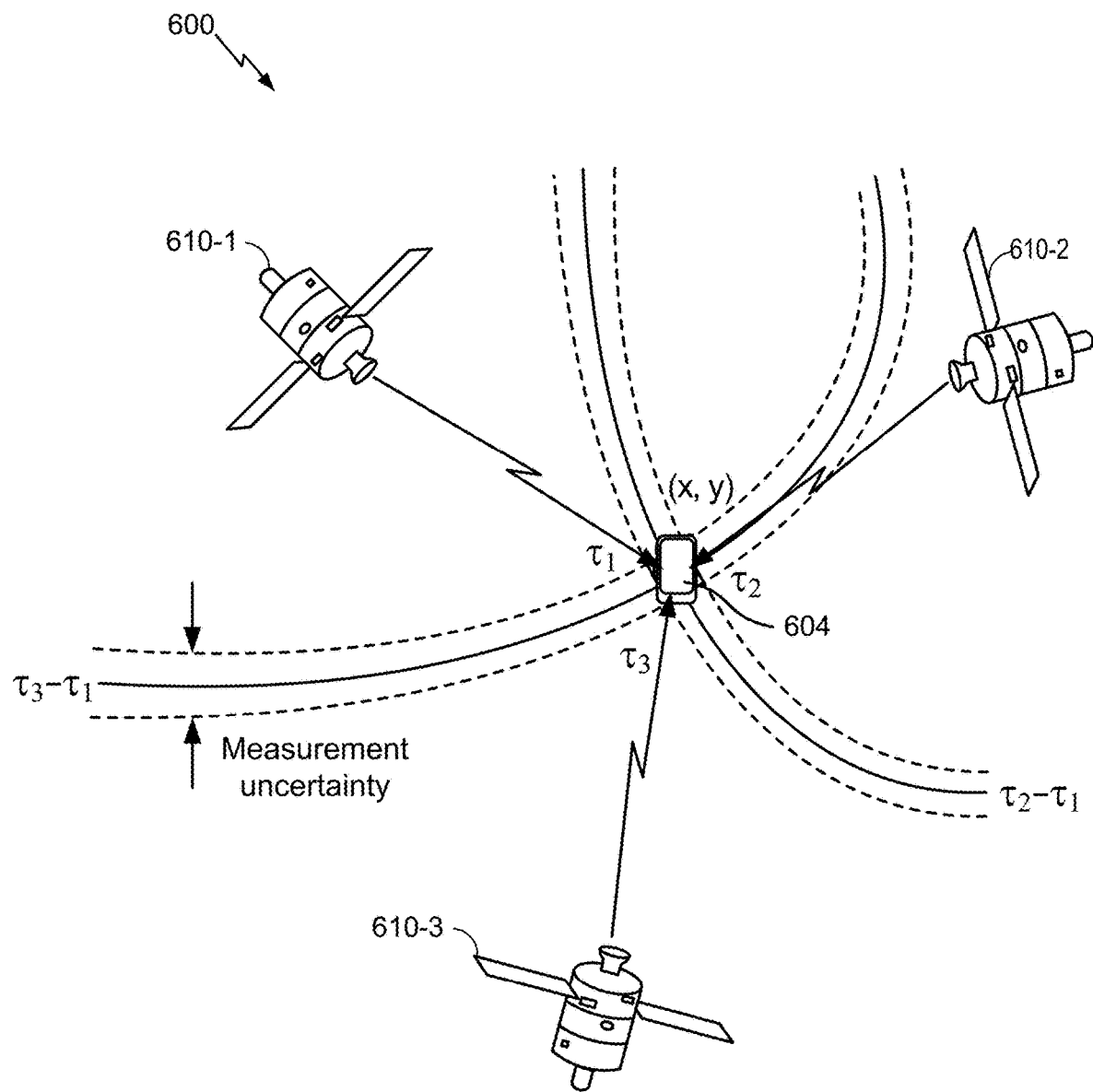
FIG. 6 is a diagram illustrating an exemplary technique for determining a position of a mobile device using information obtained from a plurality of satellites.

FIG. 6 illustrates a DL-OTDOA positioning procedure in an exemplary wireless communications system 600, according to various aspects of the disclosure. In the example of FIG. 6, a UE 604, which may correspond to any of the UEs described herein, is attempting to calculate an estimate of its position, or assist another entity (e.g., a base station or core network component, another UE, a location server, a third party application, etc.) to calculate an estimate of its position. The UE 604 may communicate wirelessly with a plurality of satellites 602-1, 602-2, and 602-3 (collectively, satellites 602, and which may correspond to any of the satellites described herein), using RF signals and standardized protocols for the modulation of the RF signals and the exchange of information packets. By extracting different types of information from the exchanged RF signals, and utilizing the layout of the wireless communications system 600 (e.g., the base stations locations, geometry, etc.), the UE 604 may determine its position, or assist in the determination of its position, in a predefined reference coordinate system. In an aspect, the UE 604 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 6 illustrates one UE 604 and three satellites 602, as will be appreciated, there may be more UEs 604 and more or fewer satellites 602.

To support position estimates, the satellites 602 may be configured to broadcast positioning reference signals (e.g., PRS) to UEs 604 in their coverage area to enable a UE 604 to measure characteristics of such reference signals. For example, the OTDOA positioning method is a multilateration method in which the UE 604 measures the time difference, known as a reference signal time difference (RSTD), between specific reference signals (e.g., PRS) transmitted by different pairs of satellites 602 and either reports these time differences to a location server, such as the location server 230 or LMF 270, or computes a location estimate itself from these time differences.

Generally, RSTDs are measured between a reference cell (e.g., a cell supported by satellite 602-1 in the example of FIG. 6) and one or more neighbor cells (e.g., cells supported by satellites 602-2 and 602-3 in the example of FIG. 6). The reference cell remains the same for all RSTDs measured by the UE 604 for any single positioning use of OTDOA and would typically correspond to the serving cell for the UE 604 or another nearby cell with good signal strength at the UE 604. In an aspect, the neighbor cells would normally be cells supported by satellites 602 different from the satellite 602 for the reference cell, and may have good or poor signal strength at the UE 604. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 604 for the reference cell and the neighbor cells relative to the reference cell. For example, the assistance data may include identifiers (e.g., PCI, VCI, cell global identity (CGI), etc.) for each cell of a set of cells that the UE 604 is expected to measure (here, cells supported by the satellites 602). The assistance data may also provide the center channel frequency of each cell, various reference signal configuration parameters (e.g., the number of consecutive positioning subframes, periodicity of positioning subframes, muting sequence, frequency hopping sequence, reference signal identifier (ID), reference signal bandwidth), and/or other cell related parameters applicable to OTDOA. The OTDOA assistance data may indicate the serving cell for the UE 604 as the reference cell.

In some cases, OTDOA assistance data may also include "expected RSTD" parameters, which provide the UE 604 with information about the RSTD values the UE 604 is expected to measure at its current location between the reference cell and each neighbor cell, together with an uncertainty of the expected RSTD parameter. The expected RSTD, together with the associated uncertainty, may define a search window for the UE 604 within which the UE 604 is expected to measure the RSTD value. OTDOA assistance information may also include reference signal configuration information parameters, which allow a UE 604 to determine when a reference signal positioning occasion occurs on signals received from various neighbor cells relative to reference signal positioning occasions for the reference cell, and to determine the reference signal sequence transmitted from various cells in order to measure a signal time of arrival (ToA) or RSTD.

In an aspect, while the location server (e.g., location server 230, LMF 270) may send the assistance data to the UE 604, alternatively, the assistance data can originate directly from the satellites 602 themselves (e.g., in periodically broadcasted overhead messages, etc.). Alternatively, the UE 604 can detect neighbor satellites itself without the use of assistance data.

The UE 604 (e.g., based in part on the assistance data, if provided) can measure and (optionally) report the RSTDs between reference signals received from pairs of satellites 602. Using the RSTD measurements, the known absolute or relative transmission timing of each satellite 602, and the known position(s) of the reference and neighboring satellites 602, the network (e.g., location server 230/LMF 270) or the UE 604 may estimate a position of the UE 604. More particularly, the RSTD for a neighbor network node "k" relative to a reference network node "Ref" may be given as $(ToA_k-ToA_{Ref})$, where the ToA values may be measured modulo one subframe duration (1 ms) to remove the effects of measuring different subframes at different times. In the example of FIG. 6, the measured time differences between the reference cell of satellite 602-1 and the cells of neighboring satellites 602-2 and 602-3 are represented as $\tau_2$-$\tau_1$ and $\tau_3$-$\tau_1$, where $\tau_1$, $\tau_2$, and $\tau_3$ represent the ToA of a reference signal from the transmitting antenna(s) of satellites 602-1, 602-2, and 602-3, respectively. The UE 604 may then convert the ToA measurements for different network nodes to RSTD measurements and (optionally) send them to the location server 230/LMF 270. Using (i) the RSTD measurements, (ii) the known absolute or relative transmission timing of each network node, (iii) the known position(s) of physical TRPs for the reference and neighboring satellites 602, and/or (iv) directional reference signal characteristics such as a direction of transmission, the UE's 604 position may be determined (either by the UE 604 or the location server 230/LMF 270).

Still referring to FIG. 6, when the UE 604 obtains a location estimate using OTDOA measured time differences, the necessary additional data (e.g., the network nodes' locations and relative transmission timing) may be provided to the UE 604 by a location server (e.g., location server 230, LMF 270). In some implementations, a location estimate for the UE 604 may be obtained (e.g., by the UE 604 itself or by the location server 230/LMF 270) from OTDOA measured time differences and from other measurements made by the UE 604 (e.g., measurements of signal timing from GPS or other GNSS satellites). In these implementations, known as hybrid positioning, the OTDOA measurements may contribute towards obtaining the UE's 604 location estimate but may not wholly determine the location estimate.

Location information for a UE can aid in addressing several of the key challenges in 5G, complementary to existing and planned technological developments. These challenges include an increase in traffic and number of devices, robustness for mission critical services, and a reduction in total energy consumption and latency. Knowledge of the location of a UE is beneficial for more efficient paging, scheduling, beamforming, multicasting, etc.

One method of determining the location of a UE was described above with reference to FIG. 6. As described above, a UE can measure the difference between the ToAs of positioning reference signals (e.g., PRS) from pairs of satellites (i.e., the OTDOA), and these measurements, along with the known locations of the transmitting satellites, can be used to determine the position of the UE using a hyperbolic multilateral algorithm. However, in existing LTE and NR PRS designs, a PRS sequence repeats every 10 ms (e.g., PRS periodicity ($T_{PRS}$)=10 ms). More specifically, a PRS sequence generator is initiated by a number that is the function of the slot number within a frame, and the duration of the frame is 10 ms. Thus, every 10 ms, a PRS sequence repeats.

For terrestrial networks, this 10 ms repetition pattern is not an issue, as in order to detect PRS from a terrestrial transmitter (e.g., a base station), a UE will always be well within a 5 ms propagation delay of the transmitter. For an NTN, however, there are scenarios where the propagation delay between a satellite and a UE can exceed 10 ms. This can create an ambiguity in measuring the ToA of a PRS from the satellite. For example, if there is a 14 ms propagation delay between a satellite and a UE and the PRS sequence repeats every 10 ms, the UE will not know if the propagation delay of the PRS is 4 ms (i.e., the difference between 10 ms and 14 ms) or 14 ms. That is, the UE may detect the ToA of the PRS from the satellite as occurring at 4 ms into a PRS sequence, but it will not know that the measured PRS was actually propagating from the satellite to the UE for the length of an entire 10 ms PRS sequence before the start of the PRS sequence in which the PRS was measured.

Figure 7:
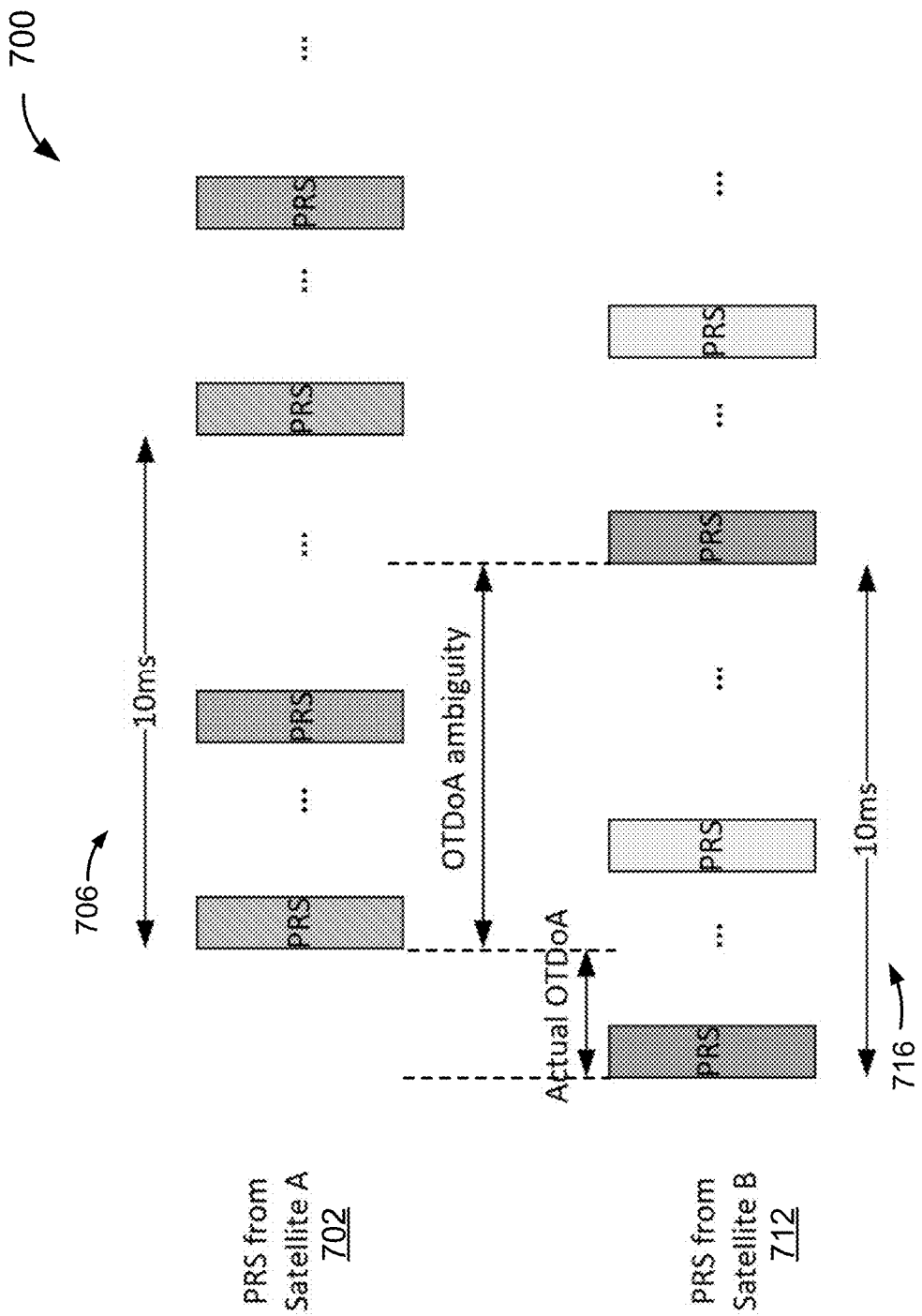
FIG. 7 is a diagram illustrating the ambiguity of measuring PRS from different satellites where the PRS periodicity is shorter than the propagation time between the satellites and a receiver.

This becomes more significant when measuring the ToAs of PRS from multiple satellites, as illustrated in FIG. 7. FIG. 7 is a diagram 700 illustrating the ambiguity of measuring PRS from different satellites where the PRS periodicity is shorter than the propagation time between the satellites and a receiver (e.g., a UE). As illustrated in FIG. 7, a satellite A 702 (e.g., one of satellites 610 in FIG. 6) transmits a first PRS sequence 706 that repeats every 10 ms, and a satellite B 712 (e.g., another one of satellites 610 in FIG. 6) transmits a second PRS sequence 716 that repeats every 10 ms. Satellite A 702 and satellite B 712 have the same system time, and therefore start transmission of their respective PRS sequences at the same time (e.g., at the start of the same radio frame). However, due to the propagation delay between the satellites and the receiver, the PRS transmissions of the respective PRS sequences arrive at the receiver at different times. Note that although FIG. 7 only illustrates two PRS transmissions (also referred to as PRS instances or PRS occasions) per PRS sequence (also referred to as a PRS burst), as will be appreciated, there may be more PRS transmissions per sequence than the two illustrated.

In the example of FIG. 7, to measure the OTDOA of PRS received from satellite A 702 and satellite B 712, the receiver measures the ToA of the first PRS transmission of the PRS sequence from each satellite. Note, however, that because the receiver is configured with the respective PRS configurations, the receiver can measure the ToAs of any two PRS transmissions transmitted during the same radio frame and adjust the RSTD/OTDOA measurement between the PRS transmissions based on the difference in transmission times of the PRS transmissions known from the respective PRS configurations. In the example of FIG. 7, the receiver receives the first PRS transmission of the PRS sequence 716 from satellite B 712 4 ms before it receives the first PRS transmission of the PRS sequence 706 from satellite A 702. Thus, the actual OTDOA between the PRS of satellite A 702 and the PRS of satellite B 712 is 4 ms. However, the PRS sequence 716 from satellite B 712 begins to repeat during the measured PRS sequence 706 from satellite A 702. As such, the UE does not know if the first PRS transmission of PRS sequence 716 is the PRS to be measured, or if the first PRS transmission of the next PRS sequence is the PRS to be measured.

Accordingly, the present disclosure provides techniques for a transmitter (e.g., a satellite, an airborne vehicle), when transmitting PRS to a receiver (e.g., a UE), to also transmit complementary timing information to the receiver to enable the receiver to avoid the timing ambiguity of not knowing during which radio frame or which PRS sequence a received PRS was transmitted, as described above with reference to FIG. 7. The complementary timing information provides timing information in a larger scale than a radio frame (the typical length of a PRS sequence). More specifically, the complementary timing information distinguishes the PRS transmissions of a given PRS sequence transmitted by a transmitter (e.g., a satellite) from the PRS transmissions of other PRS sequences transmitted by the transmitter. For example, the complementary timing information may be an SFN or a PRS burst/sequence index.

The complementary timing information can be transmitted at different times during the periodicity of a PRS sequence (e.g., 10 ms). For example, complementary timing information can be transmitted once for each PRS periodicity. As another example, complementary timing information can be transmitted once for each PRS transmission within each PRS sequence. As yet another example, complementary timing information can be transmitted once per subframe or once per multiple subframes of a radio frame. As will be appreciated, the more frequently the complementary timing information is transmitted, the faster the receiver (e.g., a UE) will be able to acquire the OTDOA measurement(s), but the more signaling overhead will be required.

Figure 8:
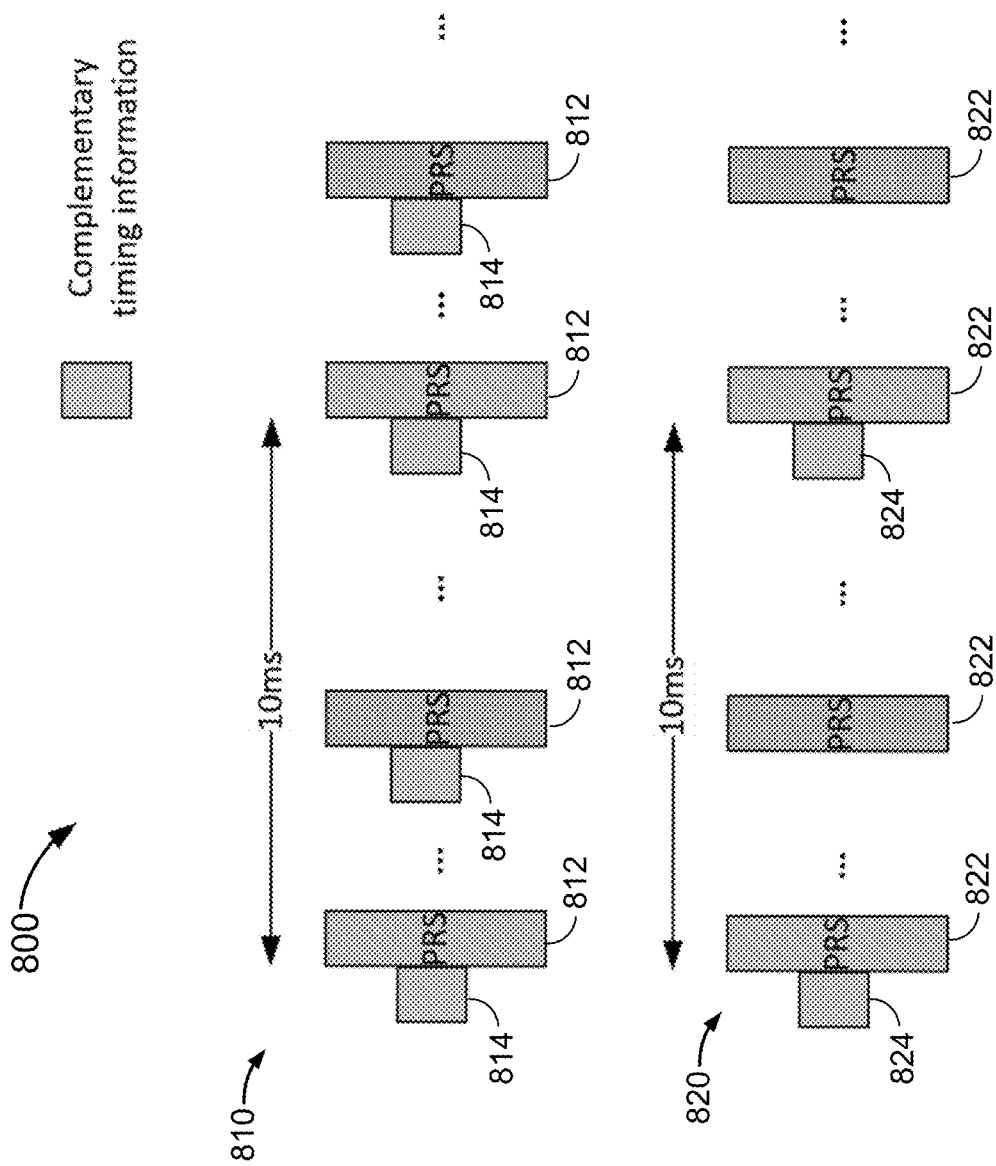
FIG. 8 is a diagram illustrating exemplary locations of complementary timing information transmissions, according to an aspect of the disclosure.

FIG. 8 is a diagram 800 illustrating exemplary locations of complementary timing information transmissions, according to an aspect of the disclosure. In the example of FIG. 8, a first PRS sequence 810 repeats every 10 ms (the length of a radio frame). Each repetition of the PRS sequence 810 includes multiple PRS transmissions 812 (also referred to as PRS occasions or PRS instances). Note that while FIG. 8 illustrates two PRS transmissions 812 per PRS sequence 810, as will be appreciated, there may be more or fewer PRS transmissions 812 per PRS sequence 810 than the two illustrated. In the example PRS sequence 810, complementary timing information 814 is transmitted before each PRS transmission 812. The complementary timing information 814 may be the SFN of the radio frame in which the PRS sequence 810 repetition is transmitted, or the sequence index of the PRS sequence 810 repetition. The complementary timing information 814 may be transmitted in the symbol immediately preceding the first symbol of the PRS transmission 812, in the slot immediately preceding the first slot of the PRS transmission 812, some number of symbols preceding the first symbol of the PRS transmission 812, or some number of slots preceding the first slot of the PRS transmission 812.

In the example of FIG. 8, a second exemplary PRS sequence 820 also repeats every 10 ms. Each repetition of the PRS sequence 820 includes multiple PRS transmissions 822. Note that while FIG. 8 illustrates two PRS transmissions 822 per PRS sequence 820, as will be appreciated, there may be more or fewer PRS transmissions 822 per PRS sequence 820 than the two illustrated. In the example PRS sequence 820, complementary timing information 824 is transmitted at the beginning of each PRS sequence 820. The complementary timing information 824 may be the SFN of the radio frame in which the PRS sequence 820 repetition is transmitted, or the sequence index of the PRS sequence 820 repetition. The complementary timing information 824 may be transmitted in the symbol immediately preceding the first symbol of the first PRS transmission 822 of the PRS sequence 820, in the slot immediately preceding the first slot of the first PRS transmission 822 of the PRS sequence 820, some number of symbols preceding the first symbol of the first PRS transmission 822, or some number of slots preceding the first slot of the first PRS transmission 822.

As will be appreciated, the locations of the complementary timing information in FIG. 8 are merely exemplary, and other locations are possible. For example, complementary timing information could be transmitted after each PRS transmission, at the end of a PRS sequence, every subframe of a PRS sequence, every slot of a PRS sequence, or the like.

In an aspect, the receiver (e.g., a UE) may be configured with the locations of the complementary timing information in various ways. For example, the transmitter may broadcast the locations of complementary timing information transmissions in synchronization signal blocks, system information blocks, or the like. Alternatively or additionally, a location server (e.g., location server 230, LMF 270) engaged in a positioning session with the receiver may send the locations of complementary timing information transmissions to the receiver. For example, the locations of the complementary timing information transmissions may be part of the PRS configuration (e.g., PRS configuration 500) received from the location server. Alternatively or additionally, the locations of the complementary timing information transmissions may be specified in the applicable standard (e.g., a 3GPP technical specification).

Whether generated by a location server or the transmitter (e.g., where the transmitter generates the PRS configuration), the transmitter may transmit the complementary timing information to the receiver on a downlink channel between the transmitter and the receiver. The downlink channel can be a control channel (e.g., a PDCCH) or a shared channel (e.g., a PDSCH).

When a PDCCH (see, e.g., FIG. 4B) is used to carry the complementary timing information, the decoding complexity at the receiver should be small. For example, the PDCCH may be transmitted in a common search space, making it easier for the receiver to locate and decode it. As described above with reference to FIG. 4B, the PDCCH carries DCI within one or more CCEs, each CCE including nine REGs, each REG including four consecutive REs in an OFDM symbol. In an aspect, the DCI format used to carry the complementary timing information may be based on a compact DCI, for example, not a non-fallback DCI including DCI 0-1 and DCI 1-1. In addition, the PDCCH may be scrambled by a cell-specific radio network temporary identifier (RNTI) to enable a receiver (e.g., a UE) that is not in an RRC connected mode to receive the complementary timing information.

When a PDSCH (see, e.g., FIG. 4B) is used to carry the complementary timing information, the decoding complexity at the receiver should be small and the extra signaling for scheduling the PDSCH should be limited. For example, when the complementary timing information is transmitted in a PDSCH, the time domain resource assignment and the frequency domain resource assignment information for the complementary timing information can be transmitted in higher layer parameters (e.g., RRC parameters) or system information (e.g., SIBs). Additionally or alternatively, the channel that carries the complementary timing information may be quasi co-located with the associated PRS transmission for the channel Doppler shift, the average Doppler spread, the delay spread, the average delay shift, the spatial receive parameters, or any combination thereof. That is, the channel Doppler shift, the average Doppler spread, the delay spread, the average delay shift, the spatial receive parameters, or any combination thereof, of the PDSCH that carries the complementary timing information may be the same as or derived from the associated PRS transmission, or vice versa.

Based on the complementary timing information associated with a received PRS transmission, the receiver device can determine whether or not the PRS transmissions from two or more different transmitters were transmitted in the same or different radio frames and/or the same or different repetitions of the respective PRS sequences. That is, if the PRS transmissions from two or more transmitters have the same complementary timing information (e.g., the same SFN, same PRS sequence index), then the receiver can determine that the PRS transmissions were transmitted during the same radio frame, and therefore, can be used to determine an accurate/unambiguous OTDOA between the PRS transmissions. If the complementary timing information indicates that the PRS transmissions were transmitted during different radio frames, the receiver can adjust any positioning measurements accordingly. For example, if the receiver receives a first PRS transmission transmitted during a first radio frame and a second PRS transmission transmitted during a second (next) radio frame (as described above with reference to FIG. 7), the receiver can adjust (e.g., subtract from or add to) the RSTD/OTDOA measurement between the two PRS by the length of a radio frame, thereby canceling out the effect of measuring PRS that were transmitted in adjacent radio frames instead of the same radio frame.

FIG. 9 illustrates an exemplary method 900 of operating a receiver device, according to aspects of the disclosure. In an aspect, the receiver device may be any of the UEs described herein.

At 910, the receiver device measures a ToA of at least one PRS transmission (e.g., PRS transmission 812) of a repetition of a first PRS sequence (e.g., PRS sequence 810) of a plurality of repetitions of the first PRS sequence transmitted by a first non-terrestrial vehicle (e.g., a satellite, airborne vehicle, etc.). In an aspect, operation 910 may be performed by NR transceiver 310, processing system 332, memory 340, and/or positioning module 342, any or all of which may be considered means for performing this operation.

At 920, the receiver device receives first complementary timing information (e.g., complementary timing information 814) associated with the repetition of the first PRS sequence. As discussed above, the first complementary timing information distinguishes the repetition of the first PRS sequence from remaining repetitions of the plurality of repetitions of the first PRS sequence. In an aspect, operation 920 may be performed by NR transceiver 310, processing system 332, memory 340, and/or positioning module 342, any or all of which may be considered means for performing this operation.

At 930, the receiver device measures a ToA of at least one PRS transmission (e.g., PRS transmission 822) of a repetition of a second PRS sequence (e.g., PRS sequence 820) of a plurality of repetitions of the second PRS sequence transmitted by a second non-terrestrial vehicle (e.g., a satellite, airborne vehicle, etc.). In an aspect, operation 930 may be performed by NR transceiver 310, processing system 332, memory 340, and/or positioning module 342, any or all of which may be considered means for performing this operation.

At 940, the receiver device receive second complementary timing information (e.g., complementary timing information 824) associated with the repetition of the second PRS sequence. As discussed above, the second complementary timing information distinguishes the repetition of the second PRS sequence from remaining repetitions of the plurality of repetitions of the second PRS sequence. In an aspect, operation 940 may be performed by NR transceiver 310, processing system 332, memory 340, and/or positioning module 342, any or all of which may be considered means for performing this operation.

At 950, based on the first complementary timing information and the second complementary timing information, the receiver device determines an OTDOA between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence. In an aspect, operation 950 may be performed by NR transceiver 310, processing system 332, memory 340, and/or positioning module 342, any or all of which may be considered means for performing this operation.

FIG. 10 illustrates an exemplary method 1000 of operating a non-terrestrial vehicle, according to aspects of the disclosure. In an aspect, the non-terrestrial vehicle may be any of the satellites, airborne vehicles, etc. described herein.

At 1010, the non-terrestrial vehicle transmits at least one PRS transmission (e.g., PRS transmission 812, 822) of a repetition of a PRS sequence (e.g., PRS sequence 810, 820) of a plurality of repetitions of the PRS sequence. In an aspect, operation 1010 may be performed by NR transceiver 350, processing system 384, memory 386, and/or positioning module 388, any or all of which may be considered means for performing this operation.

At 1020, the non-terrestrial vehicle transmits complementary timing information (e.g., complementary timing information 814, 824) associated with the repetition of the PRS sequence. As discussed above, the complementary timing information distinguishes the repetition of the PRS sequence from remaining repetitions of the plurality of repetitions of the PRS sequence. In an aspect, operation 1020 may be performed by NR transceiver 350, processing system 384, memory 386, and/or positioning module 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a receiver device, comprising:
   measuring a time of arrival (ToA) of at least one positioning reference signal (PRS) transmission of a repetition of a first PRS sequence of a plurality of repetitions of the first PRS sequence transmitted by a first non-terrestrial vehicle;
   receiving first complementary timing information associated with the repetition of the first PRS sequence, wherein the first complementary timing information distinguishes the repetition of the first PRS sequence from remaining repetitions of the plurality of repetitions of the first PRS sequence;
   measuring a ToA of at least one PRS transmission of a repetition of a second PRS sequence of a plurality of repetitions of the second PRS sequence transmitted by a second non-terrestrial vehicle;
   receiving second complementary timing information associated with the repetition of the second PRS sequence, wherein the second complementary timing information distinguishes the repetition of the second PRS sequence from remaining repetitions of the plurality of repetitions of the second PRS sequence; and
   determining, based on the first complementary timing information and the second complementary timing information, an observed time difference of arrival (OTDOA) between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

2. The method of claim 1, wherein:
   the first complementary timing information comprises a first sequence index of the repetition of the first PRS sequence, and
   the second complementary timing information comprises a second sequence index of the repetition of the second PRS sequence.

3. The method of claim 1, wherein:
   the first complementary timing information comprises a first system frame number of a first radio frame during which the repetition of the first PRS sequence was transmitted, and
   the second complementary timing information comprises a second system frame number of a second radio frame during which the repetition of the second PRS sequence was transmitted.

4. The method of claim 3, wherein the first system frame number and the first radio frame are the same as the second system frame number and the second radio frame.

5. The method of claim 3, wherein:
   the first radio frame and the second radio frame are consecutive radio frames, and
   the determining the OTDOA includes adjusting the OTDOA by a length of a radio frame.

6. The method of claim 1, wherein:
   the first complementary timing information is transmitted once per radio frame, once per subframe, once per slot, or once per PRS transmission, and
   the second complementary timing information is transmitted once per radio frame, once per subframe, once per slot, or once per PRS transmission.

7. The method of claim 1, wherein:
   the first complementary timing information is received from the first non-terrestrial vehicle, and
   the second complementary timing information is received from the second non-terrestrial vehicle.

8. The method of claim 7, wherein:
   the first complementary timing information is received from the first non-terrestrial vehicle on a first physical downlink control channel (PDCCH), and
   the second complementary timing information is received from the second non-terrestrial vehicle on a second PDCCH.

9. The method of claim 8, wherein:
the first complementary timing information is received in first downlink control information (DCI) transmitted on the first PDCCH, and
the second complementary timing information is received in second DCI transmitted on the second PDCCH.

10. The method of claim 8, wherein:
the first PDCCH is scrambled by a first cell-specific radio network temporary identifier (RNTI), and
the second PDCCH is scrambled by a second cell-specific RNTI.

11. The method of claim 10, wherein the receiver device is not in a radio resource control (RRC) connected mode when it receives the first complementary timing information and/or the second complementary timing information.

12. The method of claim 7, wherein:
the first complementary timing information is received from the first non-terrestrial vehicle on a first physical downlink shared channel (PDSCH), and
the second complementary timing information is received from the second non-terrestrial vehicle on a second PDSCH.

13. The method of claim 12, wherein time domain resource assignment and frequency domain resource assignment information for the first and second complementary timing information are received in higher layer parameters or system information.

14. The method of claim 12, wherein:
the first PDSCH is quasi-collocated with the at least one PRS transmission of the repetition of the first PRS sequence, and
the second PDSCH is quasi-collocated with the at least one PRS transmission of the repetition of the second PRS sequence.

15. The method of claim 14, wherein:
the first PDSCH being quasi-collocated with the at least one PRS transmission of the repetition of the first PRS sequence indicates that the first PDSCH has the same channel Doppler shift, average Doppler spread, delay spread, average delay shift, and spatial receive parameters as the at least one PRS transmission of the repetition of the first PRS sequence, and
the second PDSCH being quasi-collocated with the at least one PRS transmission of the repetition of the second PRS sequence indicates that the second PDSCH has the same channel Doppler shift, average Doppler spread, delay spread, average delay shift, and spatial receive parameters as the at least one PRS transmission of the repetition of the second PRS sequence.

16. The method of claim 1, further comprising:
calculating an estimate of a location of the receiver device based on the OTDOA.

17. The method of claim 1, wherein the receiver device is a user equipment (UE) and the first non-terrestrial vehicle and the second non-terrestrial vehicle are satellites or airborne vehicles.

18. A method of positioning performed by a non-terrestrial vehicle, comprising:
transmitting at least one positioning reference signal (PRS) transmission of a repetition of a PRS sequence of a plurality of repetitions of the PRS sequence; and
transmitting complementary timing information associated with the repetition of the PRS sequence, wherein the complementary timing information distinguishes the repetition of the PRS sequence from remaining repetitions of the plurality of repetitions of the PRS sequence.

19. The method of claim 18, wherein the complementary timing information comprises a sequence index of the repetition of the PRS sequence.

20. The method of claim 18, wherein the complementary timing information comprises a system frame number of a radio frame during which the repetition of the PRS sequence was transmitted.

21. The method of claim 18, wherein the non-terrestrial vehicle transmits the complementary timing information once per radio frame, once per subframe, once per slot, or once per PRS transmission.

22. The method of claim 18, wherein the non-terrestrial vehicle transmits the complementary timing information on a physical downlink control channel (PDCCH).

23. The method of claim 22, wherein the non-terrestrial vehicle transmits the complementary timing information in downlink control information (DCI) transmitted on the first PDCCH.

24. The method of claim 22, wherein the PDCCH is scrambled by a cell-specific radio network temporary identifier (RNTI).

25. The method of claim 18, wherein the non-terrestrial vehicle transmits the complementary timing information on a physical downlink shared channel (PDSCH).

26. The method of claim 25, wherein the non-terrestrial vehicle transmits time domain resource assignment and frequency domain resource assignment information in higher layer parameters or system information.

27. The method of claim 25, wherein the PDSCH is quasi-collocated with the at least one PRS transmission of the repetition of the PRS sequence.

28. The method of claim 27, wherein the PDSCH being quasi-collocated with the at least one PRS transmission of the repetition of the PRS sequence indicates that the PDSCH has the same channel Doppler shift, average Doppler spread, delay spread, average delay shift, and spatial receive parameters as the at least one PRS transmission of the repetition of the PRS sequence.

29. The method of claim 18, wherein the non-terrestrial vehicle is a satellite or an airborne vehicle.

30. A receiver device, comprising:
a memory;
at least one New Radio (NR) transceiver; and
at least one processor communicatively coupled to the memory and the at least one NR transceiver, wherein the at least one processor is configured to:
measure a time of arrival (ToA) of at least one positioning reference signal (PRS) transmission of a repetition of a first PRS sequence of a plurality of repetitions of the first PRS sequence transmitted by a first non-terrestrial vehicle;
receive, via the at least one NR transceiver, first complementary timing information associated with the repetition of the first PRS sequence, wherein the first complementary timing information distinguishes the repetition of the first PRS sequence from remaining repetitions of the plurality of repetitions of the first PRS sequence;
measure a ToA of at least one PRS transmission of a repetition of a second PRS sequence of a plurality of repetitions of the second PRS sequence transmitted by a second non-terrestrial vehicle;
receive, via the at least one NR transceiver, second complementary timing information associated with the repetition of the second PRS sequence, wherein the second complementary timing information distinguishes the repetition of the second PRS sequence from remaining repetitions of the plurality of repetitions of the second PRS sequence; and determine, based on the first complementary timing information and the second complementary timing information, an observed time difference of arrival (OTDOA) between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

31. The receiver device of claim 30, wherein:
the first complementary timing information comprises a first sequence index of the repetition of the first PRS sequence, and
the second complementary timing information comprises a second sequence index of the repetition of the second PRS sequence.

32. The receiver device of claim 30, wherein:
the first complementary timing information comprises a first system frame number of a first radio frame during which the repetition of the first PRS sequence was transmitted, and
the second complementary timing information comprises a second system frame number of a second radio frame during which the repetition of the second PRS sequence was transmitted.

33. The receiver device of claim 32, wherein the first system frame number and the first radio frame are the same as the second system frame number and the second radio frame.

34. The receiver device of claim 32, wherein:
the first radio frame and the second radio frame are consecutive radio frames, and
the at least one processor being configured to determine the OTDOA includes the at least one processor being configured to adjust the OTDOA by a length of a radio frame.

35. The receiver device of claim 30, wherein:
the first complementary timing information is transmitted once per radio frame, once per subframe, once per slot, or once per PRS transmission, and
the second complementary timing information is transmitted once per radio frame, once per subframe, once per slot, or once per PRS transmission.

36. The receiver device of claim 30, wherein:
the first complementary timing information is received from the first non-terrestrial vehicle, and
the second complementary timing information is received from the second non-terrestrial vehicle.

37. The receiver device of claim 36, wherein:
the first complementary timing information is received from the first non-terrestrial vehicle on a first physical downlink control channel (PDCCH), and
the second complementary timing information is received from the second non-terrestrial vehicle on a second PDCCH.

38. The receiver device of claim 37, wherein:
the first complementary timing information is received in first downlink control information (DCI) transmitted on the first PDCCH, and
the second complementary timing information is received in second DCI transmitted on the second PDCCH.

39. The receiver device of claim 37, wherein:
the first PDCCH is scrambled by a first cell-specific radio network temporary identifier (RNTI), and
the second PDCCH is scrambled by a second cell-specific RNTI.

40. The receiver device of claim 39, wherein the receiver device is not in a radio resource control (RRC) connected mode when it receives the first complementary timing information and/or the second complementary timing information.

41. The receiver device of claim 36, wherein:
the first complementary timing information is received from the first non-terrestrial vehicle on a first physical downlink shared channel (PDSCH), and
the second complementary timing information is received from the second non-terrestrial vehicle on a second PDSCH.

42. The receiver device of claim 41, wherein time domain resource assignment and frequency domain resource assignment information for the first and second complementary timing information are received in higher layer parameters or system information.

43. The receiver device of claim 41, wherein:
the first PDSCH is quasi-collocated with the at least one PRS transmission of the repetition of the first PRS sequence, and
the second PDSCH is quasi-collocated with the at least one PRS transmission of the repetition of the second PRS sequence.

44. The receiver device of claim 43, wherein:
the first PDSCH being quasi-collocated with the at least one PRS transmission of the repetition of the first PRS sequence indicates that the first PDSCH has the same channel Doppler shift, average Doppler spread, delay spread, average delay shift, and spatial receive parameters as the at least one PRS transmission of the repetition of the first PRS sequence, and
the second PDSCH being quasi-collocated with the at least one PRS transmission of the repetition of the second PRS sequence indicates that the second PDSCH has the same channel Doppler shift, average Doppler spread, delay spread, average delay shift, and spatial receive parameters as the at least one PRS transmission of the repetition of the second PRS sequence.

45. The receiver device of claim 30, wherein the at least one processor is further configured to:
calculate an estimate of a location of the receiver device based on the OTDOA.

46. The receiver device of claim 30, wherein the receiver device is a user equipment (UE) and the first non-terrestrial vehicle and the second non-terrestrial vehicle are satellites or airborne vehicles.

47. A non-terrestrial vehicle, comprising:
a memory;
at least one NR transceiver; and
at least one processor communicatively coupled to the memory and the at least one NR transceiver, wherein the at least one processor is configured to:
cause the at least one NR transceiver to transmit at least one positioning reference signal (PRS) transmission of a repetition of a PRS sequence of a plurality of repetitions of the PRS sequence; and
cause the at least one NR transceiver to transmit complementary timing information associated with the repetition of the PRS sequence, wherein the complementary timing information distinguishes the repetition of the PRS sequence from remaining repetitions of the plurality of repetitions of the PRS sequence.

48. The non-terrestrial vehicle of claim 47, wherein the complementary timing information comprises a sequence index of the repetition of the PRS sequence.

49. The non-terrestrial vehicle of claim 47, wherein the complementary timing information comprises a system frame number of a radio frame during which the repetition of the PRS sequence was transmitted.

50. The non-terrestrial vehicle of claim 47, wherein the at least one processor causes the at least one NR transceiver to transmit the complementary timing information once per radio frame, once per subframe, once per slot, or once per PRS transmission.

51. The non-terrestrial vehicle of claim 47, wherein the at least one processor causes the at least one NR transceiver to transmit the complementary timing information on a physical downlink control channel (PDCCH).

52. The non-terrestrial vehicle of claim 51, wherein the at least one processor causes the at least one NR transceiver to transmit the complementary timing information in downlink control information (DCI) transmitted on the first PDCCH.

53. The non-terrestrial vehicle of claim 51, wherein the PDCCH is scrambled by a cell-specific radio network temporary identifier (RNTI).

54. The non-terrestrial vehicle of claim 47, wherein the at least one processor causes the at least one NR transceiver to transmit the complementary timing information on a physical downlink shared channel (PDSCH).

55. The non-terrestrial vehicle of claim 54, wherein the at least one processor causes the at least one NR transceiver to transmit time domain resource assignment and frequency domain resource assignment information in higher layer parameters or system information.

56. The non-terrestrial vehicle of claim 54, wherein the PDSCH is quasi-collocated with the at least one PRS transmission of the repetition of the PRS sequence.

57. The non-terrestrial vehicle of claim 56, wherein the PDSCH being quasi-collocated with the at least one PRS transmission of the repetition of the PRS sequence indicates that the PDSCH has the same channel Doppler shift, average Doppler spread, delay spread, average delay shift, and spatial receive parameters as the at least one PRS transmission of the repetition of the PRS sequence.

58. The non-terrestrial vehicle of claim 47, wherein the non-terrestrial vehicle is a satellite or an airborne vehicle.

59. A receiver device, comprising:
means for measuring a time of arrival (ToA) of at least one positioning reference signal (PRS) transmission of a repetition of a first PRS sequence of a plurality of repetitions of the first PRS sequence transmitted by a first non-terrestrial vehicle;
means for receiving first complementary timing information associated with the repetition of the first PRS sequence, wherein the first complementary timing information distinguishes the repetition of the first PRS sequence from remaining repetitions of the plurality of repetitions of the first PRS sequence;
means for measuring a ToA of at least one PRS transmission of a repetition of a second PRS sequence of a plurality of repetitions of the second PRS sequence transmitted by a second non-terrestrial vehicle;
means for receiving second complementary timing information associated with the repetition of the second PRS sequence, wherein the second complementary timing information distinguishes the repetition of the second PRS sequence from remaining repetitions of the plurality of repetitions of the second PRS sequence; and
means for determining, based on the first complementary timing information and the second complementary timing information, an observed time difference of arrival (OTDOA) between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

60. The receiver device of claim 59, wherein:
the first complementary timing information comprises a first sequence index of the repetition of the first PRS sequence, and
the second complementary timing information comprises a second sequence index of the repetition of the second PRS sequence.

61. The receiver device of claim 59, wherein:
the first complementary timing information comprises a first system frame number of a first radio frame during which the repetition of the first PRS sequence was transmitted, and
the second complementary timing information comprises a second system frame number of a second radio frame during which the repetition of the second PRS sequence was transmitted.

62. The receiver device of claim 59, wherein:
the first complementary timing information is transmitted once per radio frame, once per subframe, once per slot, or once per PRS transmission, and
the second complementary timing information is transmitted once per radio frame, once per subframe, once per slot, or once per PRS transmission.

63. A non-terrestrial vehicle, comprising:
means for transmitting at least one positioning reference signal (PRS) transmission of a repetition of a PRS sequence of a plurality of repetitions of the PRS sequence; and
means for transmitting complementary timing information associated with the repetition of the PRS sequence, wherein the complementary timing information distinguishes the repetition of the PRS sequence from remaining repetitions of the plurality of repetitions of the PRS sequence.

64. The non-terrestrial vehicle of claim 63, wherein the complementary timing information comprises a sequence index of the repetition of the PRS sequence.

65. The non-terrestrial vehicle of claim 63, wherein the complementary timing information comprises a system frame number of a radio frame during which the repetition of the PRS sequence was transmitted.

66. The non-terrestrial vehicle of claim 63, wherein the means for transmitting the complementary timing information transmits the complementary timing information once per radio frame, once per subframe, once per slot, or once per PRS transmission.

67. A non-transitory computer-readable medium storing computer-executable instructions for a receiver device, the computer-executable instructions comprising:
at least one instruction instructing the receiver device to measure a time of arrival (ToA) of at least one positioning reference signal (PRS) transmission of a repetition of a first PRS sequence of a plurality of repetitions of the first PRS sequence transmitted by a first non-terrestrial vehicle;
at least one instruction instructing the receiver device to receive first complementary timing information associated with the repetition of the first PRS sequence, wherein the first complementary timing information distinguishes the repetition of the first PRS sequence from remaining repetitions of the plurality of repetitions of the first PRS sequence;
at least one instruction instructing the receiver device to measure a ToA of at least one PRS transmission of a repetition of a second PRS sequence of a plurality of repetitions of the second PRS sequence transmitted by a second non-terrestrial vehicle;
at least one instruction instructing the receiver device to receive second complementary timing information associated with the repetition of the second PRS sequence, wherein the second complementary timing information distinguishes the repetition of the second PRS sequence from remaining repetitions of the plurality of repetitions of the second PRS sequence; and
at least one instruction instructing the receiver device to determine, based on the first complementary timing information and the second complementary timing information, an observed time difference of arrival (OTDOA) between the at least one PRS transmission of the repetition of the first PRS sequence and the at least one PRS transmission of the repetition of the second PRS sequence as a difference between the ToA of the at least one PRS transmission of the repetition of the first PRS sequence and the ToA of the at least one PRS transmission of the repetition of the second PRS sequence.

68. A non-transitory computer-readable medium storing computer-executable instructions for a non-terrestrial vehicle, the computer-executable instructions comprising:
at least one instruction instructing the non-terrestrial vehicle to transmit at least one positioning reference signal (PRS) transmission of a repetition of a PRS sequence of a plurality of repetitions of the PRS sequence; and
at least one instruction instructing the non-terrestrial vehicle to transmit complementary timing information associated with the repetition of the PRS sequence, wherein the complementary timing information distinguishes the repetition of the PRS sequence from remaining repetitions of the plurality of repetitions of the PRS sequence.

* * * * *